(12) United States Patent
Gerber et al.

(10) Patent No.: US 12,491,301 B2
(45) Date of Patent: Dec. 9, 2025

(54) PERITONEAL DIALYSATE PREPARATION AND SENSOR SYSTEM

(71) Applicant: MOZARC MEDICAL US LLC, Minneapolis, MN (US)

(72) Inventors: Martin T. Gerber, Maple Grove, MN (US); Christopher M. Hobot, Rogers, MN (US); David B. Lura, Maple Grove, MN (US); Thomas E. Meyer, Stillwater, MN (US); VenKatesh R. Manda, Stillwater, MN (US)

(73) Assignee: MOZARC MEDICAL US LLC, Minneapolis, MN (US)

( * ) Notice: Subject to any disclaimer, the term of this patent is extended or adjusted under 35 U.S.C. 154(b) by 0 days.

(21) Appl. No.: 15/723,676

(22) Filed: Oct. 3, 2017

(65) Prior Publication Data

US 2018/0021501 A1    Jan. 25, 2018

Related U.S. Application Data

(63) Continuation-in-part of application No. 15/478,569, filed on Apr. 4, 2017.

(Continued)

(51) Int. Cl.
*A61M 1/28* (2006.01)
*A61K 31/19* (2006.01)
(Continued)

(52) U.S. Cl.
CPC ............ *A61M 1/287* (2013.01); *A61K 31/19* (2013.01); *A61K 31/7004* (2013.01); *A61K 33/10* (2013.01); *A61K 33/14* (2013.01); *A61L 2/10* (2013.01); *A61M 1/1656* (2013.01); *A61M 1/1672* (2014.02); *A61M 1/1674* (2014.02); *A61M 1/1686* (2013.01); *A61M 1/28* (2013.01); *C02F 1/283* (2013.01); *C02F 1/325* (2013.01); *C02F 1/42* (2013.01); *C02F 1/441* (2013.01);

(Continued)

(58) Field of Classification Search
None
See application file for complete search history.

(56) References Cited

U.S. PATENT DOCUMENTS

| 4,747,822 A | 5/1988 | Peabody |
| 5,032,265 A | 7/1991 | Jha |

(Continued)

FOREIGN PATENT DOCUMENTS

| CN | 201342127 | 11/2009 |
| CN | 103394139 | 11/2013 |

(Continued)

OTHER PUBLICATIONS

European Search Report for App. No. 17185636.2 dated Jan. 10, 2018.

(Continued)

*Primary Examiner* — Jonathan M Peo

(57) ABSTRACT

The invention relates to devices, systems, and methods for generating a peritoneal dialysate having specified concentrations of one or more solutes. The devices, systems and methods use conductivity sensors, flow meters, and composition sensors to control addition of osmotic agents and ion concentrates into a peritoneal dialysate generation flow path.

16 Claims, 10 Drawing Sheets

Related U.S. Application Data

(60) Provisional application No. 62/318,173, filed on Apr. 4, 2016.

(51) Int. Cl.

| | | |
|---|---|---|
| *A61K 31/7004* | (2006.01) | |
| *A61K 33/10* | (2006.01) | |
| *A61K 33/14* | (2006.01) | |
| *A61L 2/10* | (2006.01) | |
| *A61M 1/16* | (2006.01) | |
| *C02F 1/28* | (2023.01) | |
| *C02F 1/32* | (2023.01) | |
| *C02F 1/42* | (2023.01) | |
| *C02F 1/44* | (2023.01) | |

(52) U.S. Cl.
CPC .............. *C02F 1/442* (2013.01); *C02F 1/444* (2013.01); *A61M 1/1666* (2014.02); *A61M 2205/18* (2013.01); *A61M 2205/3306* (2013.01); *A61M 2205/3317* (2013.01); *A61M 2205/3324* (2013.01); *A61M 2205/3331* (2013.01); *A61M 2205/3334* (2013.01); *A61M 2205/3337* (2013.01); *A61M 2205/3368* (2013.01); *A61M 2205/36* (2013.01); *A61M 2205/502* (2013.01); *A61M 2205/75* (2013.01); *A61M 2205/7518* (2013.01); *A61M 2205/7545* (2013.01); *A61M 2209/084* (2013.01); *C02F 2303/04* (2013.01)

(56) References Cited

U.S. PATENT DOCUMENTS

| | | | | |
|---|---|---|---|---|
| 5,092,838 | A * | 3/1992 | Faict | A61M 1/287 |
| | | | | 210/647 |
| 5,141,493 | A * | 8/1992 | Jacobsen | A61M 1/1696 |
| | | | | 210/104 |
| 5,643,201 | A | 7/1997 | Peabody | |
| 6,042,721 | A | 3/2000 | Peters | |
| 6,818,179 | B1 * | 11/2004 | Edgson | A61L 2/04 |
| | | | | 210/143 |
| 9,700,663 | B2 | 7/2017 | Burbank | |
| 10,076,599 | B2 | 9/2018 | Eyrard | |
| 10,076,735 | B2 | 9/2018 | Jansson | |
| 10,173,881 | B2 | 1/2019 | Beavis | |
| 10,459,459 | B2 | 10/2019 | Beavis | |
| 10,478,544 | B2 | 11/2019 | Friederichs | |
| 10,610,630 | B2 | 4/2020 | Burbank | |
| 2004/0121982 | A1 * | 6/2004 | Martis | A61K 31/718 |
| | | | | 514/58 |
| 2008/0200866 | A1 | 8/2008 | Prisco | |
| 2009/0007642 | A1 * | 1/2009 | Busby | A61M 1/28 |
| | | | | 73/61.44 |
| 2009/0036825 | A1 | 2/2009 | Petersen | |
| 2009/0107335 | A1 * | 4/2009 | Wilt | A61M 1/362266 |
| | | | | 96/209 |
| 2009/0124963 | A1 | 5/2009 | Hogard | |
| 2009/0149776 | A1 * | 6/2009 | Adams | A61B 5/0059 |
| | | | | 600/584 |
| 2010/0010425 | A1 * | 1/2010 | Yu | G16H 20/40 |
| | | | | 702/19 |
| 2010/0137782 | A1 | 6/2010 | Jansson | |
| 2010/0312172 | A1 * | 12/2010 | Hoffman | A61M 1/1696 |
| | | | | 604/28 |
| 2012/0135396 | A1 | 5/2012 | McDevitt | |
| 2012/0273354 | A1 * | 11/2012 | Orhan | A61M 1/284 |
| | | | | 204/519 |
| 2012/0277551 | A1 | 11/2012 | Gerber | |
| 2013/0168316 | A1 | 7/2013 | Noguchi | |
| 2013/0263650 | A1 * | 10/2013 | Nier | A61M 1/28 |
| | | | | 73/61.46 |
| 2014/0018727 | A1 * | 1/2014 | Burbank | A61M 1/28 |
| | | | | 604/28 |
| 2014/0216250 | A1 | 8/2014 | Meyer | |
| 2014/0276376 | A1 * | 9/2014 | Rohde | A61M 1/3406 |
| | | | | 604/29 |
| 2015/0148697 | A1 | 5/2015 | Burnes | |
| 2016/0143774 | A1 * | 5/2016 | Burnett | A61F 7/0085 |
| 2016/0166753 | A1 | 6/2016 | Meyer | |
| 2017/0319768 | A1 | 11/2017 | Szpara | |
| 2018/0221555 | A1 | 8/2018 | Rohde | |
| 2019/0125952 | A1 | 5/2019 | Jansson | |
| 2019/0125954 | A1 | 5/2019 | Mathiot | |
| 2019/0151526 | A1 | 5/2019 | Wieslander | |
| 2019/0240389 | A1 | 8/2019 | Rohde | |

FOREIGN PATENT DOCUMENTS

| | | | | |
|---|---|---|---|---|
| CN | 103619372 | | 3/2014 | |
| CN | 103751871 | | 4/2014 | |
| CN | 104174077 | | 12/2014 | |
| CN | 105142692 | | 12/2015 | |
| CN | 105692957 | A | 6/2016 | |
| CN | 205672288 | | 11/2016 | |
| CN | 107206147 | | 9/2017 | |
| DE | 3224823 | | 1/1984 | |
| DE | 102006028172 | A1 | 12/2017 | |
| WO | WO1992005814 | | 4/1992 | |
| WO | WO-0057935 | A1 * | 10/2000 | ........... A61L 2/0023 |
| WO | WO2000057935 | A1 | 10/2000 | |
| WO | WO2009094035 | A1 | 1/2008 | |
| WO | WO 2012/129501 | | 9/2012 | |
| WO | WO 2017/176687 | | 10/2017 | |
| WO | WO 2017/176701 | | 10/2017 | |

OTHER PUBLICATIONS

PCTUS20170146199 ISR and written opinion, Feb. 19, 2018.
Henderson, et al, "Online Preparation of Sterile Pyrogen-Free Electrolyte Solution," Trans. Am. Soc. Artif.Intern.Organs, 1978 pp. 465-467.
Chinese Office Action for App. No. 201780019238.0, dated May 7, 2020.
Office Action for European App. No. 17718241.7, dated Apr. 2, 2020.
Chinese Office Action for App. No. 201780019237.6, dated May 25, 2020.
European Office Action for App. No. 17718246.6, dated Apr. 2, 2020.
Chinese Office Action for App. No. 201780019362.7, dated Jun. 2, 2020.
Chinese Office Action for App. No. 201811155891.2, dated Oct. 10, 2020.
Chinese Office Action for App. No. 201811107614.4, dated Sep. 28, 2020.
Office Action in Chinese App. No. 201780019238.0, dated Sep. 25, 2020.
Chinese Office Action for App. No. 201780019237.6, dated Feb. 1, 2021.
AU Examiners Report for Application No. 2017246829, dated Jan. 9, 2021.
Indian Office Action in App. No. 201847032514, dated May 21, 2021.

* cited by examiner

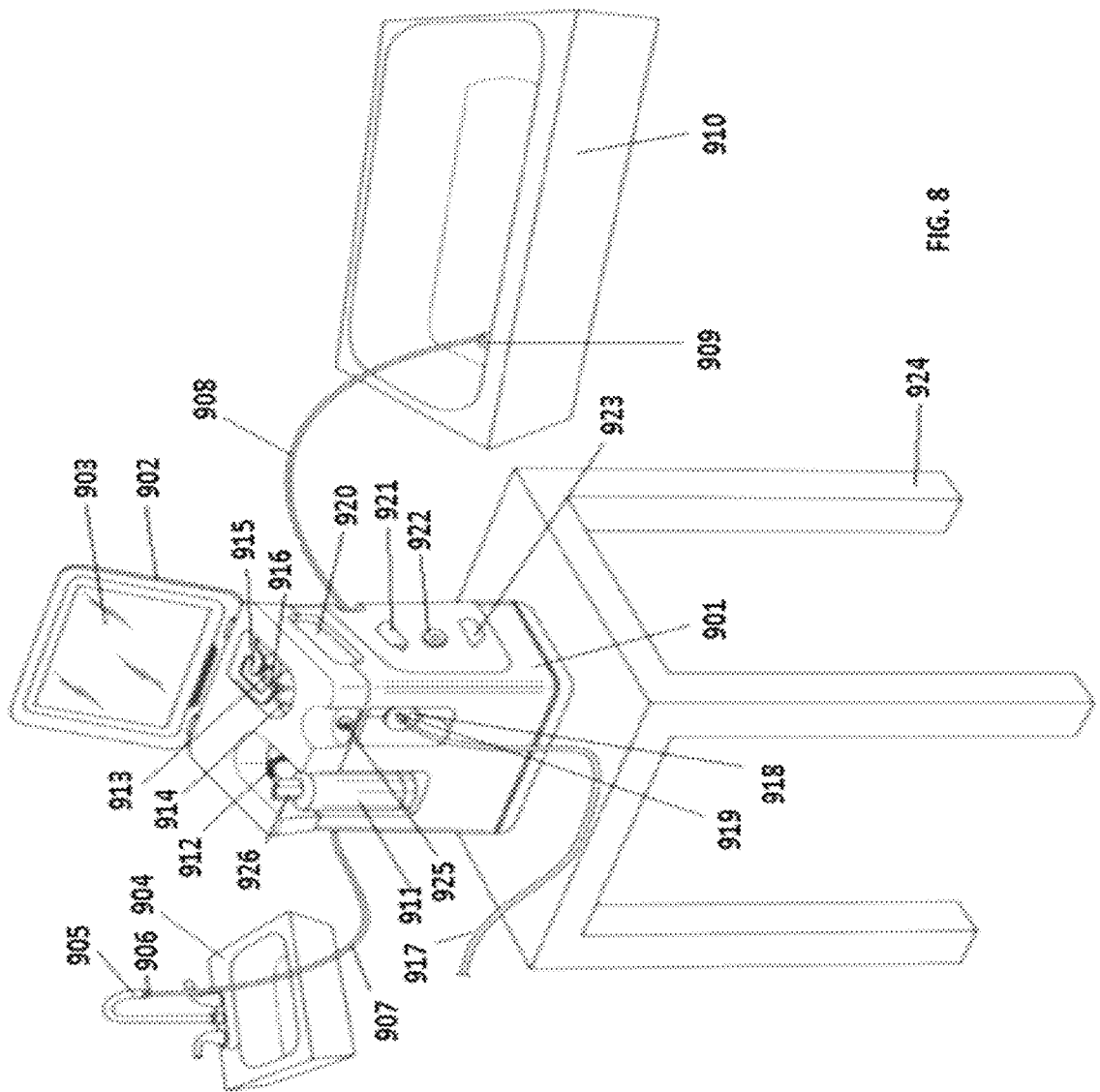

PERITONEAL DIALYSATE PREPARATION AND SENSOR SYSTEM

CROSS REFERENCE TO RELATED APPLICATIONS

This application is a continuation in part of U.S. patent application Ser. No. 15/478,569 filed Apr. 4, 2017, which claims benefit of and priority to U.S. Provisional Application No. 62/318,173 filed Apr. 4, 2016, and the disclosures of each of the above-identified applications are hereby incorporated by reference in their entirety.

FIELD OF THE INVENTION

The invention relates to devices, systems, and methods for generating a peritoneal dialysate having specified concentrations of one or more solutes. The devices, systems and methods use conductivity sensors, flow meters, and composition sensors to control addition of osmotic agents and ion concentrates into a peritoneal dialysate generation flow path.

BACKGROUND

Peritoneal Dialysis (PD), including Automated Peritoneal Dialysis (APD) and Continuous Ambulatory Peritoneal Dialysis (CAPD) can be performed at a clinic or in a home-setting either by a patient alone or with a care-giver. PD differs from Hemodialysis (HD) in that blood is not removed from the body and passed through a dialyzer, but rather a catheter is placed in the peritoneal cavity and dialysate introduced directly into the peritoneal cavity. Blood is cleaned inside the patient using the patient's own peritoneum as a type of dialysis membrane. However, because fluid is directly introduced into a human body, the fluid used for peritoneal dialysate is generally required to be free of biological and chemical contaminants. The peritoneal dialysate should also contain specified concentrations of solutes and cations for biocompatibility and for performing membrane exchange.

Known systems and methods cannot generate a peritoneal dialysate having specific and customizable solute concentrations for infusion into a patient. The known systems and methods also cannot modify the composition of the peritoneal dialysate based on a specified dialysate prescription. Importantly, the known systems and methods use premade dialysate formulations that cannot be altered based on the specific needs of individual patients.

As such, there is a need for systems and methods that can generate peritoneal dialysate having specific concentrations of solutes. The systems and methods should include sensors for measuring the solute concentrations of the generated dialysate and for ensuring the generated peritoneal dialysate matches a dialysate prescription.

SUMMARY OF THE INVENTION

The first aspect of the invention relates to a dialysate preparation system for use in peritoneal dialysis. In any embodiment, the dialysate preparation system can comprise a first fluid line fluidly connected to a water purification module; at least one ion concentrate source fluidly connected to the first fluid line through a first infusate line; the first infusate line having a first concentrate pump; one or more osmotic agent sources fluidly connected to the first fluid line through one or more secondary infusate lines; the secondary infusate lines comprising a secondary concentrate pump forming part of the one or more secondary infusates lines; wherein at least one or more conductivity sensors are positioned in the first fluid line upstream of the first infusate line; at least one or more second conductivity sensors are positioned in the first fluid line downstream of the first infusate line and upstream of the secondary infusate lines; and at least one composition sensor positioned in the first fluid line downstream of the one or more secondary infusate lines; the first fluid line fluidly connectable to an integrated cycler.

In any embodiment, the system can comprise at least one secondary composition sensor positioned in the one or more secondary infusate lines.

In any embodiment, the system can comprise a control system in communication with the composition sensor and secondary composition sensor, the control system measuring an osmotic agent concentration at the composition sensor and secondary composition sensor.

In any embodiment, the control system can control an osmotic agent flow rate based on the composition sensor and secondary composition sensor.

In any embodiment, the system can comprise at least one flow meter in the first fluid line.

In any embodiment, the flow meter can be downstream of the secondary infusate line.

In any embodiment, at least two osmotic agent sources can be fluidly connected to the one or more secondary infusate lines.

In any embodiment, the system can comprise one or more valves fluidly connecting the at least two osmotic agent sources to the secondary infusate lines.

In any embodiment, the system can comprise a control system in communication with the conductivity sensor and secondary conductivity sensor, the control system controlling an ion concentrate flow rate based on the conductivity sensor and secondary conductivity sensor.

In any embodiment, the system can comprise at least one pH sensor in the first fluid line.

In any embodiment, the composition sensor and/or secondary composition sensor can be selected from the group consisting of a refractive index sensor, an enzyme-based sensor, and a pulsed amperometric detection sensor.

In any embodiment, the system can comprise a second fluid line fluidly connecting the second infusate line to a sterilization module.

The features disclosed as being part of the first aspect of the invention can be in the first aspect of the invention, either alone or in combination, or follow a preferred arrangement of one or more of the described elements.

The second aspect of the invention is directed to a method. In any embodiment, the method can comprise the steps of (a) pumping water from a water source through a water purification module into a first fluid line; (b) measuring a first conductivity of fluid in the first fluid line; (c) pumping an ion concentrate from at least one ion concentrate source through a first infusate line into the first fluid line; (d) measuring a second conductivity of the fluid in the first fluid line downstream of the first infusate line; (e) pumping an osmotic agent concentrate from an osmotic agent source through a second infusate line into the first fluid line; and (f) measuring a first osmotic agent concentration in the first fluid line downstream of the second infusate line.

In any embodiment, the method can comprise measuring a second osmotic agent concentration in the second infusate line.

In any embodiment, the method can comprise pumping fluid from the first fluid line into a sterilization module and pumping the fluid from the sterilization module into an integrated cycler.

In any embodiment, the method can comprise receiving a dialysate prescription; and setting an ion concentrate flow rate and an osmotic agent flow rate based on the dialysate prescription.

In any embodiment, the step of setting an ion concentrate flow rate and an osmotic agent flow rate can be performed by a control system in communication with a first concentrate pump in the first infusate line and a second concentrate pump in the second infusate line.

In any embodiment, the controller can set the osmotic agent flow rate based on the first osmotic agent concentration and the dialysate prescription.

In any embodiment, the method can comprise generating an alert if the first osmotic agent concentration is outside of a predetermined range from the dialysate prescription.

In any embodiment, the method can comprise generating an alert if the second conductivity is outside of a predetermined range from the dialysate prescription.

In any embodiment, at least two osmotic agent sources can be fluidly connected to the second infusate line.

In any embodiment, the method can comprise selecting an osmotic agent source from the at least two osmotic agent sources; and pumping the osmotic agent concentrate from the selected osmotic agent source.

In any embodiment, the method can comprise either or both of a) generating the ion concentrate by pumping purified water from a sterilization module into the ion concentrate source; and/or b) generating the osmotic agent concentrate pumping purified water from the sterilization module into the osmotic agent source.

In any embodiment, either or both of a) the step of generating the ion concentrate can comprise agitating the ion concentrate after pumping the purified water into the ion concentrate source, heating the purified water prior to pumping the purified water into the ion concentrate source, or combinations thereof; and/or b) the step of generating the osmotic agent concentrate can comprise agitating the osmotic agent concentrate after pumping the purified water into the osmotic agent source, heating the purified water prior to pumping the purified water into the osmotic agent source, or combinations thereof.

The features disclosed as being part of the second aspect of the invention can be in the second aspect of the invention, either alone or in combination, or follow a preferred arrangement of one or more of the described elements.

BRIEF DESCRIPTION OF THE DRAWINGS

FIG. 8 shows a peritoneal dialysate generation cabinet connected to a faucet and drain.

DETAILED DESCRIPTION OF THE INVENTION

Figure 1:
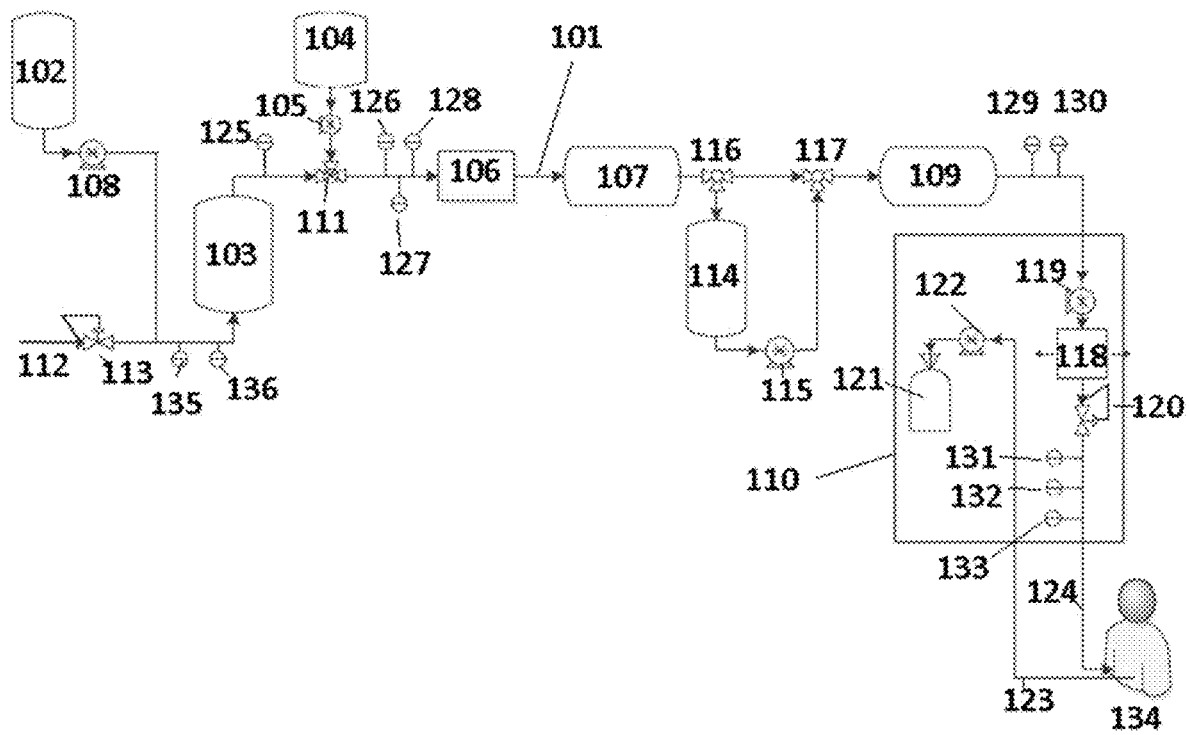
FIG. 1 shows a peritoneal dialysate generation flow path with an integrated cycler.

Unless defined otherwise, all technical and scientific terms used have the same meaning as commonly understood by one of ordinary skill in the art.

The articles "a" and "an" are used to refer to one or to over one (i.e., to at least one) of the grammatical object of the article. For example, "an element" means one element or over one element.

The terms "agitating" or to "agitate" refer to mixing or otherwise moving a fluid or substance by mechanical means.

The term "communication" refers to an electronic or wireless link between two components.

A "composition sensor" is a device capable of measuring a concentration of one or more solutes in a fluid.

The term "comprising" includes, but is not limited to, whatever follows the word "comprising." Use of the term indicates the listed elements are required or mandatory but that other elements are optional and may be present.

A "concentrate pump" is a pump configured to move fluid between a concentrate source and a flow path.

A "conductivity sensor" is device for measuring the electrical conductance of a solution and/or the ion, such as a sodium ion, concentration of a solution.

The term "consisting of" includes and is limited to whatever follows the phrase "consisting of" The phrase indicates the limited elements are required or mandatory and that no other elements may be present.

The term "consisting essentially of" includes whatever follows the term "consisting essentially of" and additional elements, structures, acts or features that do not affect the basic operation of the apparatus, structure or method described.

The terms "control," "controlling," or "controls" refers to the ability of one component to direct the actions of a second component.

A "control system" can be a combination of components acting together to maintain a system to a desired set of performance specifications. The control system can use processors, memory and computer components configured to interoperate to maintain the desired performance specifications. The control system can also include fluid or gas control components, and solute control components as known within the art to maintain the performance specifications.

The term "dialysate" describes a fluid into or out of which solutes from a fluid to be dialyzed diffuse through a membrane. For example, for peritoneal dialysis, solutes can be diffused through a peritoneal membrane of a patient. Dialysate can differ depending on the type of dialysis to be carried out. For example, dialysate for peritoneal dialysis may include different solutes or different concentrations of solutes than dialysate for hemodialysis.

The term "dialysate preparation system" refers to a set of components capable of generating a peritoneal dialysate from constituent parts.

The term "dialysate prescription" refers to the concentration of one or more solutes in peritoneal dialysate intended for use by a patient.

The term "downstream" refers to a position of a first component in a flow path relative to a second component wherein fluid, gas, or combination thereof, will pass by the second component prior to the first component during normal operation. The first component can be said to be "downstream" of the second component, while the second component is "upstream" of the first component.

An "enzyme-based sensor" is a component that measures a concentration of a first substance by catalytically converting the first substance to a second substance and measuring the amount of the second substance produced.

A "flow meter" is a device capable of measuring an amount or rate of fluid moving past or through a particular location.

The term "fluid" can be any substance without a fixed shape that yields easily to external pressure such as a gas or a liquid. Specifically, the fluid can be water containing any solutes at any concentration. The fluid can also be dialysate of any type including fresh, partially used, or spent.

The terms "fluid connection," "fluidly connectable," or "fluidly connected" refer to the ability to pass fluid or gas from one point to another point. The two points can be within or between any one or more of compartments, modules, systems, and components, all of any type.

A "fluid line" can refer to a tubing or conduit through which a fluid, gas, or fluid containing gas can pass. The fluid line can also contain air during different modes of operation such as cleaning or purging of a line.

The term "generating" or to "generate" refers to creating a substance or fluid from constituent parts.

The term "generating an alert" or to "generate an alert" can refer to generating or signaling to a user a state or condition of a system.

The terms to "generate peritoneal dialysate," "generating peritoneal dialysate" or "peritoneal dialysate generation" refers to creating a peritoneal dialysate solution from constituent parts.

The terms "heating" or to "heat" refer to raising the temperature of a substance, fluid, gas, or combinations of fluid and gas. The term can also refer to raising the temperature of a component such as container or a fluid line as described herein.

The term "infusate line" refers to a fluid line for carrying peritoneal osmotic agents and/or cation infusates into a peritoneal dialysate generation flowpath.

An "integrated cycler" is a component for movement of fluid into and out of the peritoneal cavity of a patient, wherein the integrated cycler forms a part of an overall system. For example, the integrated cycler can be contained in a housing with other components used for peritoneal dialysis and be in fluid and electrical connection with desired components.

An "ion concentrate" refers to one or more ionic compounds. The ion concentrate can have one or more ionic compounds in the ion concentrate. Further, the ion concentrate can have an ion concentration greater than an ion concentration to be used in dialysis.

An "ion concentrate source" refers to a source of one or more ionic compounds. The ion concentrate source can be in water or solid form. The ion concentrate source can further have one or more ionic compounds that are at a higher ion concentration greater than generally used in dialysis.

The term "measuring" or "to measure" can refer to determining any parameter or variable. The parameter or variable can relate to any state or value of a system, component, fluid, gas, or mixtures of one or more gases or fluids.

An "osmotic agent" is a substance dissolved in water capable of driving a net movement of water by osmosis across a semi-permeable membrane due to concentration differences of the osmotic agent on each side of the semi-permeable membrane.

The term "osmotic agent concentration" refers to an amount of an osmotic agent dissolved in a given volume of a fluid.

The term "osmotic agent flow rate" refers to a rate of fluid movement from an osmotic agent source.

An "osmotic agent source" refers to a source of osmotic agents in solid and/or solution form. The osmotic agent source can interface with at least one other module found in systems for dialysis. The osmotic agent source can contain at least one fluid pathway and include components such as conduits, valves, filters or fluid connection ports, any of which are fluidly connectable to each other or to a fluid flow path. The osmotic agent source can either be formed as a stand-alone enclosure or a compartment integrally formed with an apparatus for dialysis for containing an osmotic agent source. If the osmotic agent(s) is in solid form, a system as described in the present invention can deliver a fluid, such as a highly purified or sterile water, to dilute the solid osmotic agent. Optional mechanical agitation or other means such as stirring can be used to help dissolve the solid osmotic agent.

"Peritoneal dialysate" is a dialysis solution to be used in peritoneal dialysis having specified parameters for purity and sterility. Peritoneal dialysate is not the same as dialysate used in hemodialysis although peritoneal dialysate may be used in hemodialysis.

"Peritoneal dialysis" is a therapy wherein a dialysate is infused into the peritoneal cavity, which serves as a natural dialyzer. In general, waste components diffuse from a patient's bloodstream across a peritoneal membrane into the dialysis solution via a concentration gradient.

In general, excess fluid in the form of plasma water flows from a patient's bloodstream across a peritoneal membrane into the dialysis solution via an osmotic gradient. Once the infused peritoneal dialysis solution has captured sufficient amounts of the waste components the fluid is removed. This cycle can be repeated for several cycles each day or as needed.

A "pH sensor" is a component capable of measuring a concentration of hydrogen ions in a fluid.

The term "predetermined range" is a range of possible values for a parameter to be set as.

A "pulsed amperometric detection sensor" is a component that measures a concentration of a substance by applying an electrical potential to a sample, resulting in oxidation or reduction of the substance.

The term "pump" refers to any device that causes the movement of fluids or gases by applying suction or pressure.

The terms "pumping fluid" or to "pump fluid" refer to moving a fluid or gas through a flow path with a pump.

"Purified water" can be defined as water produced by distillation, deionization, reverse osmosis, or other suitable processes and that meets the definition of "purified water" in the United States Pharmacopeia, 23d Revision, Jan. 1, 1995, and the FDA at 21 CFR Section § 165.110(a)(2)(iv). Other criteria for purified water can be determined by those of skill in the art, particularly as relating to purified water suitable for peritoneal dialysis.

A "refractive index sensor" is a component that measures the speed of light in a substance relative to the speed of light in a vacuum.

The term "secondary" as used in relation to a component is meant to distinguish two similar components and is not intended to describe the structure or function of the component being described as "secondary.".

The term "selecting" or to "select" refers to choosing a variable or parameter from a set of possible variables or parameter.

"Setting," "to set," and the like, can refer to an adjustment of any parameter, component, or algorithm to any particular value or position. The adjustment can include adjustment in any manner such as positioning a component, performing a physical act, or bringing any parameter, computer, algorithm, or computer into a particular state whether implemented by hand, a processor, a computer, or algorithm.

A "sterilization module" can be a component or set of components to sterilize a fluid, gas, or combination thereof by removing or destroying chemical or biological contaminants.

The term "upstream" refers to a position of a first component in a flow path relative to a second component wherein fluid, gas, or combinations thereof, will pass by the first component prior to the second component during normal operation. The first component can be said to be "upstream" of the second component, while the second component is "downstream" of the first component.

A "valve" can be a device capable of directing the flow of fluid or gas by opening, closing or obstructing one or more pathways to allow the fluid or gas to travel in a path. One or more valves configured to accomplish a desired flow can be configured into a "valve assembly."

The term "water purification module" refers to a component or components capable of removing biological or chemical contaminants from water.

The term "water source" refers to a source from which potable water can be obtained.

Peritoneal Dialysis Preparation and Sensor System

The invention relates to systems and methods for generating and using peritoneal dialysate in peritoneal dialysis. A system for generating peritoneal dialysate and delivering peritoneal dialysis therapy to a patient 134 can be configured as illustrated in FIG. 1. The system includes a peritoneal dialysate generation flow path 101. Fluid from a water source, such as water tank 102, can be pumped into the peritoneal dialysate generation flow path 101. Additionally, or as an alternative to a water tank 102, the system can use a direct connection 112 to a water source. System pump 108 can control the movement of fluid through the peritoneal dialysate generation flow path 101. If a direct connection 112 to a water source is used, a pressure regulator 113 ensures the incoming water pressure is within a predetermined range. The system pumps the fluid from water source through a water purification module 103 to remove chemical contaminants in the fluid in preparation for creating dialysate.

The water source can be a source of potable water including a purified water source. Purified water can refer to any source of water treated to remove at least some biological or chemical contaminants. The water tank 102 can alternatively be a non-purified water source, such as tap water, wherein the water from the water tank 102 can be purified by the system as described. A non-purified water source can provide water that has undergone no additional purification, water that has undergone some level of purification, but does not meet the definition of "purified water" provided, such as bottled water or filtered water. The peritoneal dialysate generation flow path 101 can also have a direct connection 112 to a purified or non-purified water source, shown as direct connection 112. The water source can be any source of water, whether from a tap, faucet, or a separate container or reservoir.

The water purification module 103 can be a sorbent cartridge. The sorbent cartridge can include aluminum oxide for removal of fluoride and heavy metals. The sorbent cartridge can have a first layer of aluminum oxide, a second layer of activated carbon and a third layer of an ion exchange resin. The sorbent cartridge can be sized depending on the needs of the user, with a larger sized sorbent cartridge allowing for more exchanges before the sorbent cartridge must be replaced. The sorbent cartridge can also include activated carbon. The activated carbon operates to adsorb non-ionic molecules, organic molecules, and chlorine from the water, along with some endotoxins or bacterial contaminants. In certain embodiments, the sorbent cartridge can include activated carbon, activated alumina, and potentially other components that work primarily by physical and chemical adsorption, combined with one or more ion exchange materials. The ion exchange materials can be any known material in the art, but preferably the ion exchange materials will release hydrogen and hydroxyl ions in exchange for other cations and anions in solution, resulting in water formation by the exchange process.

The sorbent cartridge can additionally include a microbial filter and/or a particulate filter. A microbial filter can further reduce the amount of bacterial contaminants present in the fluid from the water tank 102 or direct connection 112. Optionally, an ultrafilter can be included to remove endotoxins from the fluid. A particulate filter can remove particulate matter from the fluid. The water tank 102 can be any size usable with the system, including between around 12 and around 25 L. A water tank 102 of 20 L can generally generate the necessary peritoneal dialysate for multiple cycles. In certain embodiments, the water purification module 103 can include an optional UV light source for further purification and sterilization of the water prior to adding osmotic agents or ion concentrates.

Alternatively, the water purification module 103 can be any component capable of removing contaminants from the water in the water source, including any one or more of a sorbent cartridge, reverse osmosis module, nanofilter, combination of cation and anion exchange materials, activated carbon, activated alumina, silica, or silica based columns.

After the fluid passes through the water purification module 103, the fluid is pumped to a concentrate source 104, where necessary components for carrying out peritoneal dialysis can be added from the concentrate source 104. The concentrates in the concentrate source 104 are utilized to create a peritoneal dialysis fluid that matches a dialysate prescription. Concentrate pump 105 and concentrate valve 111 can control the movement of concentrates from the concentrate source 104 to the peritoneal dialysate generation flow path 101 in a controlled addition. Concentrate valve 111 can be replaced with a hose T. A hose T is a fluid connector in a T-shape, with a port at each end for fluid to enter or exit the hose T. The concentrates added from the concentrate source 104 to the peritoneal dialysate generation flow path 101 can include any component prescribed for use in peritoneal dialysate. Table 1 provides non-limiting exemplary ranges of commonly used components of peritoneal dialysate.

TABLE 1

| Component | Concentration |
| --- | --- |
| Sodium chloride | 132-134 mmol/L |
| Calcium chloride dehydrate | 1.25-1.75 mmol/L |
| Magnesium chloride hexahydrate | 0.25-0.75 mmol/L |
| Sodium Lactate | 35-40 mmol/L |
| Dextrose (D-glucose) monohydrate | 0.55-4.25 g/dL |
| pH | 5-6 |
| Osmolality | 346-485 (hypertonic) |

To reduce the glucose degradation products (GDP) formed, some peritoneal dialysate systems use a low GDP formulation. Exemplary peritoneal dialysate concentrations for low GDP formulations are provided in Table 2. Generally, the low GDP peritoneal dialysate is provided in two separate bags, with one bag containing calcium chloride, magnesium chloride and glucose maintained at low pH, and the second bag containing sodium chloride and the buffer components, including sodium lactate and sodium bicarbonate. The two bags are mixed prior to use to generate a peritoneal dialysate with a neutral pH. Alternatively, a two-chamber bag can be used to prevent mixing of fluids prior to use wherein the chambers, can for example, be separated by a wall of a divider of any type.

TABLE 2

Low GDP peritoneal dialysate formulations

| Component | Concentration |
| --- | --- |
| Sodium | 132-134 mEq/L |
| Calcium | 2.5-3.5 mEq/L |
| Magnesium | 0.5-1.0 mEq/L |
| Lactate | 0-40 mEq/L |
| Bicarbonate | 0-34 mEq/L |
| PH | 6.3-7.4 |
| % glucose (g/dL) | 1.5-4.25 |

One of skill in the art will understand that other components can be used in place of the components listed in Tables 1-2. For example, dextrose as listed in Table 1 is commonly used as an osmotic agent. However, other osmotic agents can be used in addition to, or in place of, the dextrose, including glucose, icodextrin or amino acids, including dialysate with multiple osmotic agents. Although the sources of sodium, calcium, and magnesium listed in Table 1 are chloride salts, other sodium, magnesium, and calcium salts can be used, such as lactate or acetate salts. Peritoneal dialysate may also contain buffers for maintaining pH of the peritoneal dialysate, including bicarbonate buffer, acetate buffer, or lactate buffer. Although not generally used in peritoneal dialysis, potassium chloride can be used for hypokalemic patients who don't receive sufficient potassium through diet. The concentrate source 104 can contain one or more osmotic agents, as well as one or more ion concentrates, such as concentrated sodium chloride, sodium lactate, magnesium chloride, calcium chloride, and/or sodium bicarbonate. The concentrate source 104 can be a single source of concentrates, including both osmotic agents and ion concentrates, or can include multiple sources of concentrates, with separate sources for the osmotic agents and ion concentrates. The system can have a single concentrate that has all components mixed for a daytime or overnight treatment for use in a home by a single patient. Alternatively, the concentrate source 104 can include separate sources for any solutes to be used in the peritoneal dialysate each with a separate concentrate pump to add each solute. The ion concentrate source can be contained in an vessel or container of any type. The ion concentrate source can either be formed as a stand-alone enclosure or a compartment integrally formed with an apparatus for dialysis for containing an ion concentrate source.

Concentrate pump 105 pumps concentrated solutions from the concentrate source or sources 104 to the peritoneal dialysate generation flow path 101 in a controlled addition. Where more than one concentrate source is used, separate concentrate pumps can move each of the concentrates into the peritoneal dialysate generation flow path 101, or a single concentrate pump can be used, with valves configured allow individual control over the movement of each of the concentrate solutions to the peritoneal dialysate generation flow path 101.

After addition of solutes from the concentrate source 104, the fluid in the peritoneal dialysate generation flow path 101 can contain all the necessary solutes for peritoneal dialysis. The peritoneal dialysate should reach a level of sterility for peritoneal dialysis. The level of sterility can be any level that meets an applicable regulatory requirement, such as a sterility assurance level of $10^{-6}$ required by the FDA, meaning that the chance a viable organism is present after sterilization is 1 in 1,000,000. The system can pump the fluid to a sterilization module for sterilization of the peritoneal dialysate. As shown in FIG. 1, the sterilization module can include one or more of a first ultrafilter 107, a second ultrafilter 109, and an optional UV light source 106. The sterilization module can be any component or set of components capable of sterilizing the peritoneal dialysate. The sterilization module can be comprised of single or multiple ultrafilters. The number of ultrafilters can vary from one, two, three, four, and more depending on configuration and usage. A secondary component, such as a UV light source 106 or microbial filter (not shown), can be used in the sterilization module to provide additional sterilization of the peritoneal dialysate. The sterilization module can also include at least two ultrafilters, including second ultrafilter 109 for further sterilization of the fluid and redundancy of the system to protect against sterilization failure. The UV light source 106 can be positioned at any location in the peritoneal dialysate generation flow path 101, including upstream of ultrafilter 107, between ultrafilters 107 and 109 or downstream of ultrafilter 109. The ultrafilters 107 and 109 used in the sterilization module can be replaced as necessary. In one non-limiting embodiment, the ultrafilters 107 and 109 can have a 3-6 month lifetime before replacement. However, no limitation on the lifespan of the ultrafilters is imposed by the system. The ultrafilters 107 and 109 can be any ultrafilter known in the art capable of sterilizing the peritoneal dialysate. A non-limiting example of an ultrafilter is the hollow fiber ForClean ultrafilter, available from Bellco, Mirandola (MO), Italy. In certain embodiments, the sterilization module 106 can use heat sterilization. The sterilization module can include a heater (not shown) to heat the prepared dialysate. Alternatively or additionally, the sterilization module can include a flash pasteurization module (not shown) to sterilize the dialysate through flash pasteurization. The sterilization module can include both heat-based sterilization components and filtration based sterilization components, with a processor, controller, or user adjusting the mode of sterilization based on the mode of use. For example, a heat based sterilization can be used when the peritoneal dialysate is generated for later use, while a filtration based sterilization can be used when the peritoneal dialysate is generated for immediate use.

The generated peritoneal dialysate can be pumped directly to an integrated cycler 110 for immediate infusion into a patient 134. Alternatively, the dialysate can be pumped to an optional dialysate container 114 as a pre-prepared bolus of solution for storage until ready for use by a patient 134. Valve 116 can control the movement of fluid to either the integrated cycler 110 or the dialysate container 114. Stored dialysate in dialysate container 114 can be pumped as needed to the integrated cycler 110 by pump 115 through valve 117. The dialysate container 114 can include one or more sterilized dialysate bags. The dialysate bags, once filled with peritoneal dialysate, can be stored until needed by the patient 134. The dialysate container 114 can alternatively be a reusable sterilized container or bag. The reusable container or bag can be cleaned and sterilized daily, or at set time periods. Alternatively, the dialysate container 114 can be any type of storage container, such as a stainless-steel container. The dialysate container 114 can store enough peritoneal dialysate for a single infusion cycle of peritoneal dialysate into the patient 134, or enough peritoneal dialysate for multiple infusions into a patient 134. Additional or alternative storage containers can be included at other locations in the peritoneal dialysate generation flow path 101. A storage container can be included upstream of the sterilization module, and downstream of the water purification module 103. Before the fluid is utilized in the cycler stage, the fluid can be pumped through the sterilization module to ensure sterility of stored fluid. Further, concentrates can be added to fluid before storing the fluid, or after storage of the fluid but prior to sterilization in the sterilization module.

The storage containers can be either upstream or downstream of the concentrate source 104. The addition of concentrates to the fluid can happen either before storage of the fluid, or after storage of the fluid just before sterilization in the sterilization module.

By generating and immediately using the peritoneal dialysate, the dialysate storage time can be reduced, reducing the possibility of bacterial growth. A user interface can be included on the peritoneal dialysis generation machine in communication with the control system, allowing a patient 134 to direct the generation of peritoneal dialysate at a selected time as needed. Additionally, or alternatively, the peritoneal dialysate machine can include a timer, and the timer can cause the peritoneal dialysate machine to generate peritoneal dialysate at predetermined times according to the patient's 134 peritoneal dialysis schedule. Alternatively, the peritoneal dialysate generation machine can be equipped with wireless communication, such as Wi-Fi, Bluetooth, Ethernet, or any other wireless communication system known in the art. The user can direct the peritoneal dialysis machine to generate peritoneal dialysate at a specified time from any location. By using a timer, user interface, or wireless communication to control the generation of peritoneal dialysate on demand, the peritoneal dialysate storage time can be reduced, lowering the chances of generating significant amounts of degradation products or allowing bacterial growth.

The peritoneal dialysate can be generated and used in real time, with direct infusion of the peritoneal dialysate into the patient 134 through the integrated cycler 110. For real time generation and use of the peritoneal dialysate, the flow rate of fluid through the peritoneal dialysate generation flow path 101 can be between 50 and 300 ml/min. With the online generation of fluid described, a flow rate of 300 ml/min can support an exchange time of between 10 and 15 minutes for a full cycle of draining and filling the peritoneal cavity of a patient 134. If a dialysate container 114 is used to store generated peritoneal dialysate, the flow rate of fluid through the peritoneal dialysate generation flow path 101 can be any flow rate capable of producing the necessary peritoneal dialysate. In certain embodiments, the flow rate can be at least around 15 mL/min, which will produce 20 L of peritoneal dialysate in 24 hrs. The integrated cycler 110 can then infuse the generated peritoneal dialysate into the peritoneal cavity of a patient 134. The integrated cycler 110 and the rest of the system can communicate for the purposes of generation and use of the peritoneal dialysate by any method known in the art, including Bluetooth, Wi-Fi, Ethernet, or direct hardware connections to meet patient or clinic needs. Additional valves and regulators (not shown in FIG. 1) can be included to aid in connection and operation of the peritoneal dialysate generation flow path 101 and integrated cycler 110. The integrated cycler 110 and the peritoneal dialysate generation flow path 101 can communicate directly, or can each communicate with a control system for control over the generation and use of the peritoneal dialysate.

In certain embodiments, the dialysate container 114 can store enough peritoneal dialysate for multiple infusions into the patient 134, including enough peritoneal dialysate for one day or more of treatment. A timer can be included in the control system and can cause the machine to generate fresh peritoneal dialysate each day or at set times.

The integrated cycler 110 can include a metering pump 119 for metering peritoneal dialysate into the peritoneal cavity of the patient 134. An in-line heater 118 heats the peritoneal dialysate to a desired temperature prior to infusion into the patient 134. A pressure regulator 120 ensures the peritoneal dialysate pressure is within a predetermined range safe and comfortable for infusion into the patient 134. The metering pump 119 can use any safe pressure for infusing fluid into the patient 134. Generally, the pump pressures are on average set at ±10.3 kPa or 77.6 mmHg. If there is no fluid flow, the maximum pressure can increase to ±15.2 kPa or 113.8 mmHg for a short period, such as less than 10 seconds. The peritoneal dialysate is infused into the peritoneal cavity of the patient 134 through infusion line 124. An additional microbial filter (not shown) may be used to sterilize the peritoneal dialysis fluid immediately before the peritoneal dialysate enters the patient 134. After a dwell period, the peritoneal dialysate is drained from the patient 134 through drain line 123. Pump 122 provides a driving force for removing the peritoneal dialysate from the patient 134. Treatment, other than the first full cycle for a patient in APD, generally begins with drainage of the peritoneal cavity of the patient 134, prior to infusing the fresh peritoneal dialysate into the patient 134. An optional waste reservoir 121 can be included to store the used peritoneal dialysate for disposal. Alternatively, the drain line 123 can be directly connected to a drain for direct disposal. A standard waste reservoir 121 is 15 L, however, the waste reservoir 121 can be any size, including between 12 and 20 L. For patients requiring a higher drainage, a drain manifold can be included for connecting multiple waste reservoirs. There is no set rate for draining of peritoneal dialysate from the peritoneal cavity of the patient 134, and any flow rate can be used with the integrated cycler 110.

Various sensors positioned in the peritoneal dialysate generation and infusion system ensure that the generated fluid is within predetermined parameters. Flow meter 135 ensures the incoming water is at a correct flow rate, while pressure sensor 136 ensures the incoming water is at an appropriate pressure. Conductivity sensor 125 is used to ensure that the water exiting water purification module 103 has been purified to a level safe for use in peritoneal dialysis. Conductivity sensor 126 ensures the conductivity of the dialysate after the addition of concentrates from concentrate source 104 is within a predetermined range. Refractive index sensor 127 ensures that the concentration of the osmotic agents is within a predetermined range. pH sensor 128 ensures the pH of the peritoneal dialysate is within a predetermined range. After passing through the sterilization module including second ultrafilter 109, pH sensor 129 and conductivity sensor 130 are used to ensure that no changes in the pH or conductivity have occurred during purification or storage of the dialysate in dialysate container 114. The integrated cycler 110 has flow meter 131, pressure sensor 132 and temperature sensor 133 to ensure that the dialysate being infused into the patient 134 is within a proper flow rate, pressure, and temperature range. The flow meter 131 can also calculate the volume of solution infused into the patient 134. The pressure sensor 132 can monitor the pressure in the peritoneal cavity.

Overfill, or excessive solution in the peritoneal cavity beyond the target volume may present complications in therapy. Overfill can be caused by many factors, including failing to fully drain the peritoneal cavity prior to infusion of fresh peritoneal dialysate. In any embodiment, the integrated cycler 110 can start therapy with a drain step to ensure that no peritoneal dialysate remains in the peritoneal cavity. Monitoring both pressure and volume of peritoneal dialysate introduced to the patient 134 can avoid overfill. If the pressure rises to a certain point, the system can be programmed to end filling or send an alert to a user to complete filling of the peritoneal cavity at a desired level. The volume of peritoneal dialysate extracted from and introduced to the patient 134 can also be monitored with flow meters to ensure proper volumes of exchanges. Draining the peritoneal cavity can be performed in a similar manner by monitoring the pressure and volume of the drained peritoneal dialysate.

As illustrated in FIG. 1, the necessary solutes can be added to the peritoneal dialysate generation flow path 101 from a single concentrate source 104. The solutes can be present in concentrated from within the concentrate source 104 in a fixed ratio for peritoneal dialysis, as shown in Table 1. Using a single concentrate source 104 for all solutes results in peritoneal dialysate having a fixed ratio of each of the solutes.

Table 3 provides exemplary non-limiting ranges of solutes that can be added from a single concentrate source 104 to the peritoneal dialysate generation flow path 101, including the starting concentration of the solutes in the concentrate source, as well as exemplary final volumes of the solutes in the dialysate and the exemplary flow rates of both the solutes and the water in the peritoneal dialysate generation flow path 101 that will achieve those concentrations. The solutes shown in Table 3 are traditional peritoneal dialysate solutes. Table 4 shows exemplary ranges of solutes that can be used as a low GDP formulation. Table 5 shows exemplary ranges of solutes that can be used with icodextrin as the osmotic agent. Icodextrin is sometimes used as an osmotic agent for a long dwell period. If dextrose or glucose is used in a long dwell period, reabsorption of the ultrafiltrate can occur, reducing the net volume of fluid removed. Icodextrin results in a long sustained ultrafiltration, and can provide improved ultrafiltration efficiency over a long dwell period. One of skill in the art will understand that the concentrations of any of the solutes shown in Tables 3-5 can be altered by altering the flow rates of the system pump 108 or concentrate pump 105. However, the ratio of the solutes included is fixed if using a single concentrate source 104. If the ratio of the solutes needs to be altered for any reason, a new concentrate solution may be needed.

TABLE 3

Exemplary solutes for addition from a single concentrate source

| Component | Concentration (g/l) | Solution volume (ml/L) | Flow rate (ml/min) |
|---|---|---|---|
| Glucose | 100-850 | 50-400 | 1-18 |
| Sodium Chloride | 13-108 | 50-400 | 1-18 |
| Sodium Lactate | 11-90 | 50-400 | 1-18 |
| $MgCl_2 \cdot 6H_2O$ | 0.13-1.02 | 50-400 | 1-18 |
| $CaCl_2 \cdot 2H_2O$ | 0.6-5.1 | 50-400 | 1-18 |
| Water | | 600-950 | 50-1000 |

TABLE 4

Exemplary solute ranges in a low GDP solution

| Component | Concentration (g/l) | Solution volume (ml/L) | Flow rate (ml/min) |
|---|---|---|---|
| Glucose | 100-900 | 50-400 | 1-18 |
| Sodium Chloride | 13-108 | 50-400 | 1-18 |
| Sodium Lactate | 11-90 | 50-400 | 1-18 |
| $MgCl_2 \cdot 6H_2O$ | 0.13-1.02 | 50-400 | 1-18 |
| $CaCl_2 \cdot 2H_2O$ | 0.6-5.1 | 50-400 | 1-18 |
| Water | | 600-950 | 50-1000 |

TABLE 5

Exemplary solute ranges in icodextrin solution

| Component | Concentration (g/l) | Solution volume (ml/L) | Flow rate (ml/min) |
|---|---|---|---|
| Icodextrin | 100-850 | 100-400 | 2-37 |
| Sodium Chloride | 13-108 | 100-400 | 1-18 |
| Sodium Lactate | 11-90 | 100-400 | 2-37 |
| $MgCl_2 \cdot 6H_2O$ | 0.13-1.02 | 100-400 | 2-37 |
| $CaCl_2 \cdot 2H_2O$ | 0.6-5.1 | 100-400 | 2-37 |
| Water | | 600-900 | 50-1000 |

Although using a single concentrate source 104 in the system requires a fixed ratio of solutes in the generated peritoneal dialysate, a single concentrate source 104 provides certain advantages. Storage requirements are decreased, as only a single concentrate solution needs to be stored for a given dialysate prescription. There is also a lower risk of patient error in adding solutes to the dialysate in the proper amounts. A single concentrate source 104 also requires less supplies, less pumps, and less hardware. Further, because fewer containers are needed, the containers are easier to manage, clean, and disinfect. A higher concentration of solutes in the concentrate source 104 will allow minimization of the container size and maximization of the source water used in PD solution preparation, lowering costs. The limiting factor is mutual solubility of the components, which is generally limited by glucose or icodextrin solubility. The flow rate for the source water can be optimized to adjust the time required to prepare the solution. In the case of on-demand dialysate preparation, a high flow rate is desired to minimize the time needed to prepare the solution. The flow rate limit will be controlled by the metering accuracy of the concentrate pump 105 at the rate required to match the water feed. With a single concentrate source 104, about 150 ml/exchange can be needed, which corresponds to about 600 ml/day or 4.2 L/week. The concentrate source 104 can be sized depending on the needs of the user, with a larger concentrate source requiring less frequent refilling.

The system can also include an additional waste reservoir (not shown in FIG. 1) to collect any waste fluid generated by the water purification module 103 or other components. Alternatively, waste reservoir 121 can also be used to collect any waste fluid generated by the water purification module 103 or other components. The waste reservoir 121 collects effluent generated during disinfection and/or effluent generated by the purification modules, such as a reverse osmosis system.

The peritoneal dialysate generation flow path 101 and integrated cycler 110 can be disinfected with a disinfection solution through on-board disinfection if the components of the peritoneal dialysate generation flow path 101 and integrated cycler 110 are to be reused. Disinfection may not be required with a fully disposable peritoneal dialysate generation flow path 101. The peritoneal dialysate generation flow path 101 and integrated cycler 110 can be configured to form a loop by connecting the portion of the peritoneal dialysate generation flow path 101 that connects to water tank 102 or the direct connection 112 to a water source to the infusion line 124. The disinfection solution can be introduced into the peritoneal dialysate generation flow path 101 and recirculated through the fluid lines by system pumps 108 and 119. Alternatively, the peritoneal dialysate generation flow path 101 and integrated cycler 110 can be disinfected separately after disconnection of the integrated cycler 110 from the peritoneal dialysate generation flow path 101. The disinfection solution can be a citric acid solution, a peracetic acid solution, a bleach solution, or any other disinfection solution known in the art. Disinfectant can be circulated through the flow loop and heated. The disinfectant can be heated to any temperature capable of disinfecting the system, including temperatures of at least 80° C. or greater. The disinfectant can be introduced to the flow loop and recirculated at elevated temperatures to ensure complete disinfection.

Figure 2:
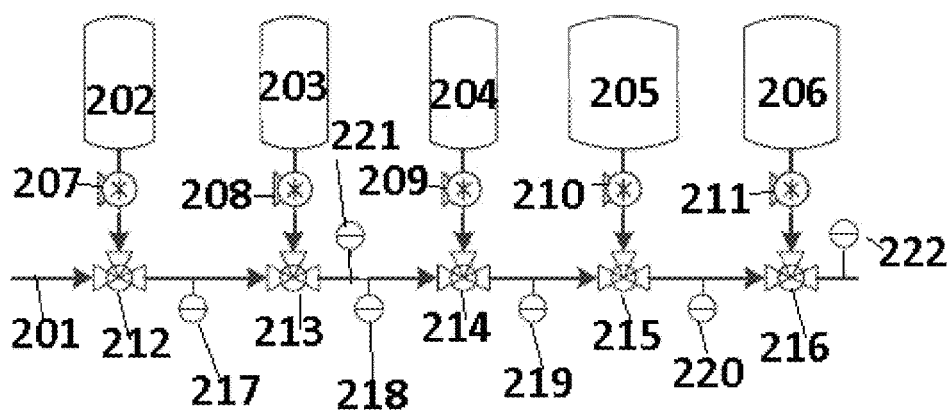
FIG. 2 shows a system for adding concentrates to a peritoneal dialysate generation flow path.

Solutes can be added to the peritoneal dialysate generation flow path 201 from two or more separate concentrate sources, as shown in FIG. 2. The peritoneal dialysate generation flow path 201 can be fluidly connected to a water source and a water purification module upstream of the concentrate sources 202-206, and a sterilization module, an integrated cycler, and optionally a dialysate container downstream of the concentrate sources 202-206, as illustrated in FIG. 1. For clarity, these components have been omitted from FIG. 2.

As illustrated in FIG. 2, the concentrate sources 202-206 can include one or more ion concentrate sources, such as sodium chloride source 202 containing sodium chloride to be added in a controlled addition to the peritoneal dialysate generation flow path 201 by concentrate pump 207 through valve 212, sodium lactate source 203 containing sodium lactate to be added in a controlled addition to the peritoneal dialysate generation flow path 201 by concentrate pump 208 through valve 213, magnesium chloride source 204 containing magnesium chloride to be added in a controlled addition to the peritoneal dialysate generation flow path 201 by concentrate pump 209 through valve 214, and calcium chloride source 205 containing calcium chloride to be added in a controlled addition to the peritoneal dialysate generation flow path 201 by concentrate pump 210 through valve 215. One of skill in the art will understand that other ions can be used in formulation of peritoneal dialysate, and each can be contained in a separate ion concentrate source or combined into one or more combined ion concentrate sources. The concentrate source also includes one or more osmotic agent sources, such as dextrose source 206 containing dextrose to be added to the peritoneal dialysate generation flow path 201 by concentrate pump 211 through valve 216. Any of the concentrate pumps can include flow meters to control the addition of the solutes. A glucose source and/or an icodextrin source can be used in addition to, or in place of, dextrose source 206. Multiple osmotic agents can be added to the peritoneal dialysate generation flow path 201 from one or more osmotic agent sources. One of skill in the art will understand other solutes can be used alternatively to, or in addition to, the solutes illustrated in FIG. 2. A control system in electronic communication with each of the concentrate pumps can control the movement of fluid from the concentrate sources to the peritoneal dialysate generation flow path 201. The amount of each of the concentrates moved into the peritoneal dialysate generation flow path 201 can be controlled to result in peritoneal dialysate having a prescribed solute concentration, as determined by a doctor or health care provider. The valves 212-216 can optionally be replaced with hose T junctions with additional components for preventing backflow into the concentrate source line if that particular line is not being used. Optional sensors 217, 218, 219, and 220 ensure the solute concentration in the dialysate is at the correct level after each addition. The sensors 217-220 can be any type of sensor appropriate to confirm delivery of the concentrate, such as conductivity sensors. Optional pH sensor 221 can be used to ensure that the pH is a proper level after addition of sodium lactate or other buffer. Optional refractive index sensor 222 ensures the dextrose concentration in the dialysate is at the prescribed level. An additional sensor can be included upstream of sodium chloride source 202 for sensing the conductivity of the water prior to addition of concentrates. One of skill in the art will understand that additional sensor arrangements can be used in the described system. Any number of sensors can be included to monitor the peritoneal dialysate concentration, including 1, 2, 3, 4, 5, 6, 7, or more sensors. The concentrate sources can contain the solutes in either solid, powdered, or solution form. A solid or powdered source of solutes can be dissolved by the system by drawing fluid from the peritoneal dialysate generation flow path 201 into the concentrate source to generate a solution with a known concentration, such as a saturated solution of the solutes. During the process of dissolution of the solutes, agitating the concentrates by mechanical means, vibration, heating the concentrates, or other forms of assistance may be used to dissolve the solid or powder solutes. The resulting solution is added to the peritoneal dialysate generation flow path as explained. Although shown as a refractive index sensor 222 in FIG. 2, one of skill in the art will understand that alternative methods of measuring the osmotic agent concentration can be used, including enzyme based sensors or pulsed amperometric detection. Enzyme-based sensors can detect the concentration of the osmotic agent in the dialysate. Enzyme based sensors use an enzyme capable of oxidizing the osmotic agent, such as glucose or dextrose. The enzyme is immobilized on an electrode and covered in a membrane through which the osmotic agent can pass. The electrode is used to electrochemically measure the change in either the oxidant, such as oxygen, or the product of glucose oxidation, such as hydrogen peroxide. Alternatively, electron transfer between the electrode and the enzyme can be detected with mediators, such as ferrocene to facilitate electron transfer. The osmotic agents can alternatively be detected by a pulsed amperometric detection sensor (PAD). PAD can detect glucose by applying a positive potential to a sample, resulting in oxidation of the glucose. The oxidation products are adsorbed onto the electrode and then desorbed by applying a more positive potential. Applying the more positive potential results in formation of an oxide layer on the electrode leading to passivation of the electrode surface. The catalytic activity of the electrode is then restored by application of a more negative potential, resulting in dissolution of the oxide layer.

Although illustrated as a single concentrate source in FIG. 1, and five separate concentrate sources in FIG. 2, one of skill in the art will understand that any number of concentrate sources can generate the peritoneal dialysate, including 1, 2, 3, 4, 5, 6, 7, or more concentrate sources. Any two or more of the separate concentrate sources illustrated in FIG. 2 can be combined into a single solute source, such as by combining all or some of the ion concentrate sources into a single ion concentrate source where the mixed contents do not cause precipitation of the mixed concentrates. Although each concentrate source is illustrated in FIG. 2 with a separate concentrate pump and fluid line, one of skill in the art will understand that more than one concentrate source can use a single pump and fluid line, with valves arranged thereon for controlled addition to the peritoneal dialysate generation flow path 201.

The concentrate sources 202-206 can be single use concentrate sources or disposable concentrate sources. The disposable concentrate sources are used in a single peritoneal dialysate generation process and then disposed. Multiple use concentrate sources are used repeatedly, and refilled as necessary with the solute.

Table 6 provides exemplary, non-limiting, ranges of solutes that can be added to the peritoneal dialysate using a separate osmotic agent source, glucose in Table 6, and a separate ion concentrate source containing sodium chloride, sodium lactate, magnesium chloride, calcium chloride and sodium bicarbonate. Because the glucose is added separately from the ion concentrates, the ratio of glucose to the other solutes can be varied depending on the needs of the patient.

TABLE 6

Exemplary ranges of solutes in a two-concentrate source system

| Component | Concentration (g/l) | Solution volume (ml/L) | Dialysate composition | |
|---|---|---|---|---|
| Part A | | | | |
| Glucose | 850 | 6-53 | 0.55-4.5 | g/dL |
| Part B | | | | |
| NaCl | 269 | 20 | 92 | mmol/L |
| Sodium Lactate | 84 | 20 | 15 | mmol/L |
| MgCl$_2$•6H$_2$O | 5 | 20 | 0.5 | mmol/L |
| CaCl$_2$•2H$_2$O | 18 | 20 | 2.5 | mmol/L |
| NaHCO$_3$ | 105 | 20 | 25 | mmol/L |
| Water | | 927-979 | 56.10 | |

By using multiple concentrate sources, greater individualization and therapy customization can be achieved for each patient. With a single concentrate source, all solutes in the generated peritoneal dialysate must be present in a fixed ratio. By using more than one concentrate source, the ratio of solutes used in the peritoneal dialysate can be altered as the concentration of each of the osmotic agent and ion solutes can be individually controlled. For example, as illustrated by Table 6, with a single ion concentrate source and a single osmotic agent source, peritoneal dialysate with greater or less osmotic agent per concentration of ions can be generated, providing the ability to adjust the tonicity of the peritoneal dialysate solution independently of the electrolyte composition to meet the UF needs of any patient with a single set of solutions and allowing greater control over ultrafiltration. The ultrafiltration rate that results from using the peritoneal dialysate solutions can be altered by altering the concentration of the osmotic agent independently of the ionic solutes, or by changing the osmotic agent used. Because the system is not limited to discrete glucose or other osmotic agent concentrations like known commercial solutions; the system can customize the peritoneal dialysate solutions to meet the ultrafiltration needs of patient as determined by a healthcare provider. As illustrated in Table 6, the glucose level in the peritoneal dialysate solution can be varied from 0.55 g/dL to 4.5 g/dL, while maintaining the electrolytes and buffer components constant, allowing the system to cover the range of glucose formulations currently offered commercially using a single Part A and Part B composition.

In certain embodiments, two osmotic agent sources can be used, such as a dextrose source and an icodextrin source. With two osmotic agent sources, one could use dextrose during the daytime exchanges for CAPD and icodextrin during the night dwell to take advantage of the higher UF removal from icodextrin. Conversely, dextrose could be used during the night dwell and icodextrin for the extended daytime dwell in APD systems.

By using separate concentrate sources for each solute, complete individualization of the concentrations and ratios of solutes in the peritoneal dialysate can be achieved. Table 7 provides exemplary ranges of solutes that can be used in peritoneal dialysate as made by a system with each solute in a separate concentrate source. An advantage of using separate concentrate sources for each solute is that virtually any peritoneal dialysate solution composition can be prepared from a single set of component formulations. A system with separate concentrate sources for each solute is useful for patients whose prescriptions change periodically due to diet or other factors. Such patients would need to store multiple formulations if using only one or two concentrate sources, and the risk of errors would be increased.

TABLE 7

Exemplary dialysate composition from a multi-source system

| Component | Concentration (g/l) | Solution volume (ml/L) | Dialysate composition | |
|---|---|---|---|---|
| Part A: Glucose | 850 | 6-53 | 0.55-4.5 | g/dL |
| Part B: NaCl | 320 | 15-18 | 132-134 | mmol/L |
| Part C: Na Lactate | 1000 | 2-4 | 15-40 | mmol/L |
| Part D: MgCl2•6H2O | 500 | 0.2-0.4 | 0.5-1.0 | mmol/L |
| Part E: CaCl2•2H2O | 700 | 0.5-1.0 | 2.5-3.5 | mmol/L |
| Part F: NaHCO3 | 85 | 0-34 | 0-34 | mmol/L |
| Part G: Icodextrin | 1000 | 0-75 | 0-7.5 | g/dL |
| Water | | 820-971 | | |

The one or more concentrate sources can be detachable from the rest of the system for sterilization. The concentrate sources can also be sterilized each time the concentrate sources are filled with new concentrate solutions. Further, the concentrate sources can be sterilized after a set number of uses, or after a set period of time. Moreover, the concentrate sources and the rest of the peritoneal dialysate generation system can be sterilized without any of the components by passing a disinfection solution, such as a citric acid, peracetic acid, or bleach solution, through all of the lines and containers of the system.

Figure 3:
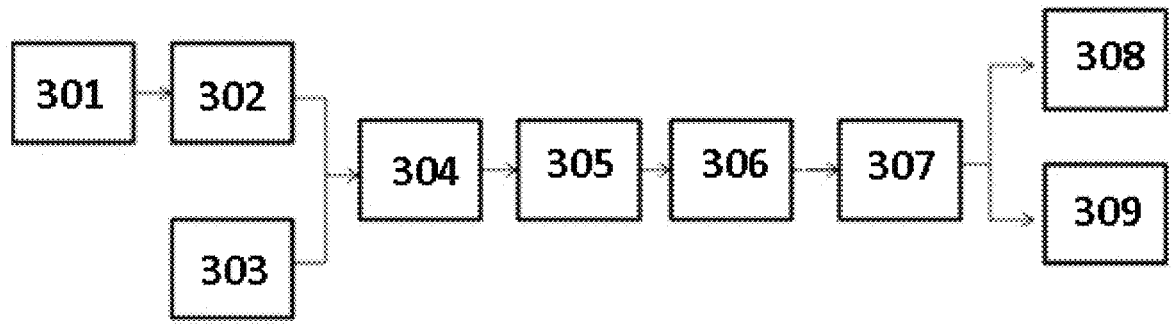
FIG. 3 shows an overview of a system for generating and using peritoneal dialysate with a single concentrate source.

FIG. 3 illustrates an overview of generating peritoneal dialysate in accordance with any embodiment of the invention. Water from a water source 301 can be purified by a water purification module 302, as explained. Concentrates from a single concentrate source 303, which can contain both ion concentrates and one or more osmotic agents, can be added to the purified water to generate a non-sterile peritoneal dialysate solution 304. The non-sterile peritoneal dialysate solution 304 is sterilized by a sterilization module 305, which may include an ultrafilter (not shown). As explained, the peritoneal dialysate can be further purified by additional components in the sterilization module 306, such as by ultrafiltration with a second ultrafilter, by a microbial filter, or by an optional UV light source, to generate a sterilized peritoneal dialysate 307. The sterilized peritoneal dialysate 307 can be stored or used by any method described herein, including by immediately infusing the peritoneal dialysate into a patient 308, or dispensing the peritoneal dialysate into a dialysate container for later use in peritoneal dialysis 309, as illustrated in FIG. 1.

Figure 4:
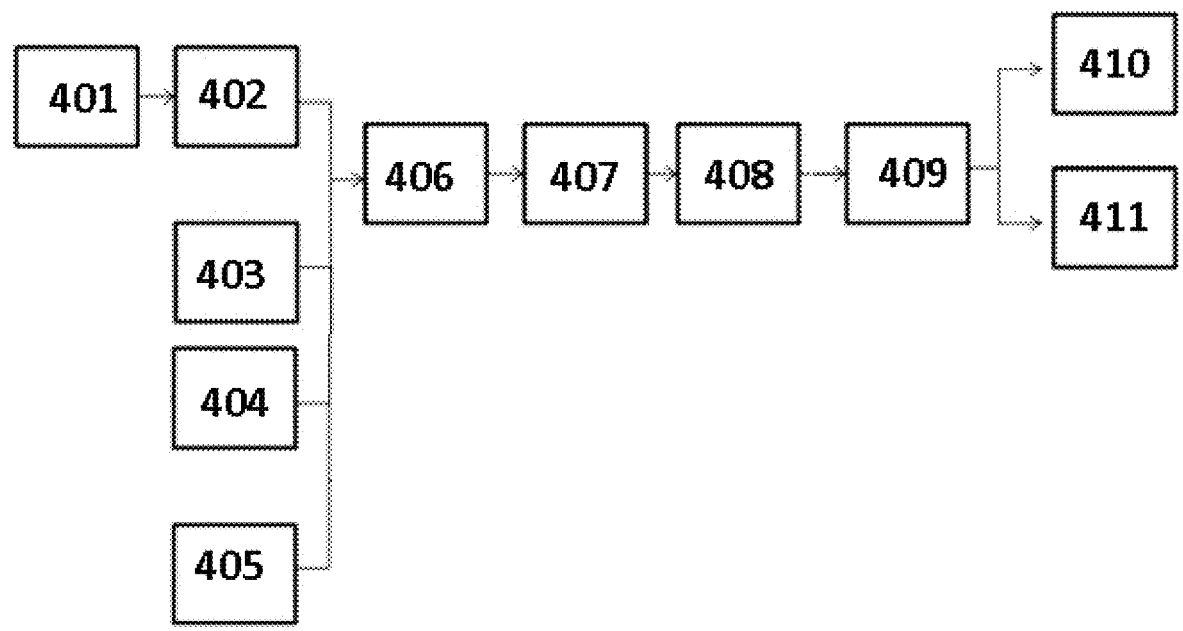
FIG. 4 shows an overview of a system for generating and using peritoneal dialysate with multiple concentrate sources.

FIG. 4 illustrates an overview of generating peritoneal dialysate with multiple concentrate sources. Water from a water source 401 can be purified by a water purification module 402, as explained. Concentrates from an ion concentrate source 403, which can contain sodium, magnesium, calcium, and bicarbonate, as well as any other ions to be used in peritoneal dialysis, can be added to the purified fluid. An osmotic agent, such as dextrose, can be added from a first osmotic agent concentrate source 404. A second osmotic agent, such as icodextrin, can be added from a second osmotic agent concentrate source 405. As illustrated in FIG. 2, any number of concentrate sources can be used for further individualization of the peritoneal dialysate, including separate sources for each of the ions used. After addition of the ion and osmotic agent concentrates, the fluid contains all necessary components for use in peritoneal dialysis as non-sterilized peritoneal dialysate 406. The non-sterile peritoneal dialysate 406 can be sterilized by a sterilization module 407, which can include an ultrafilter or other sterilization components. The peritoneal dialysate can be further sterilized by the sterilization module 408, either by ultrafiltration with a second ultrafilter, a microbial filter, or further sterilized with an optional UV light source, to generate a sterilized peritoneal dialysate 409. The sterilized peritoneal dialysate 409 can be stored or used by any method described herein, including by immediately infusing the peritoneal dialysate into a patient 410, or dispensing the peritoneal dialysate into a dialysate container for later use in peritoneal dialysis 411, as illustrated in FIG. 1.

Figure 5:
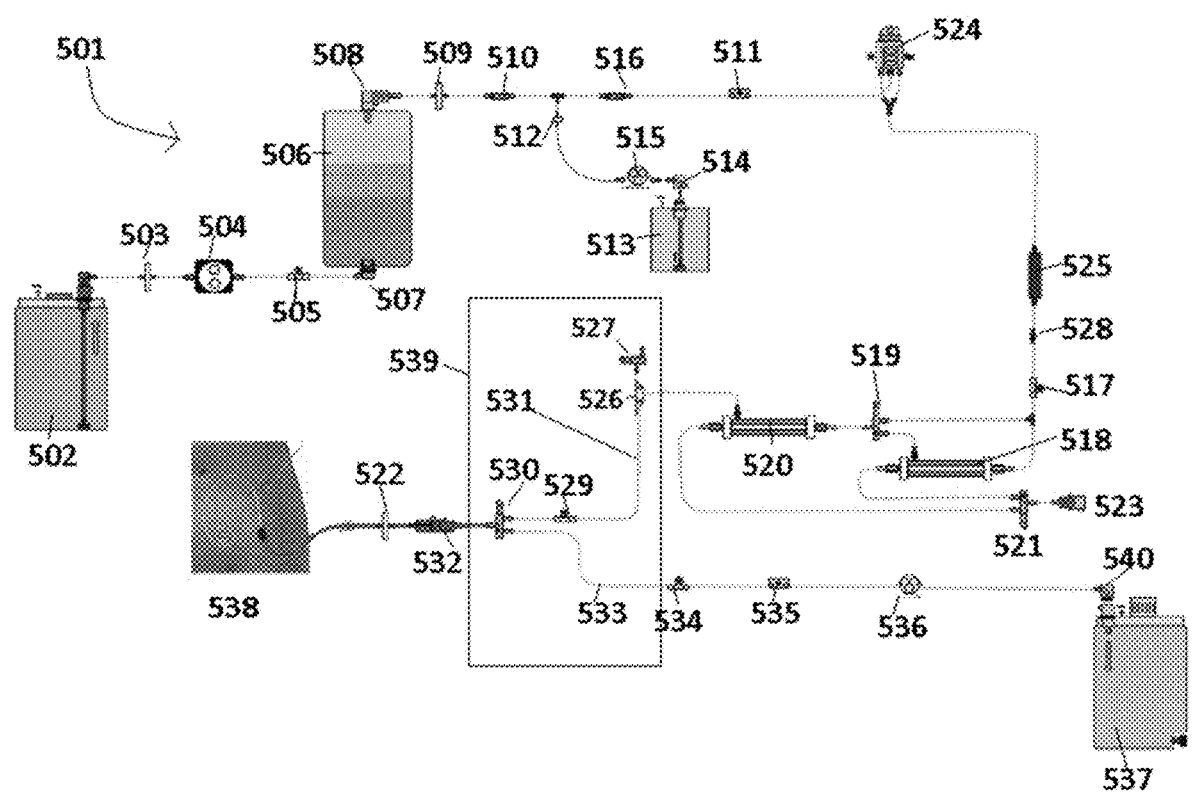
FIG. 5 shows an alternative peritoneal dialysate generation flow path with an integrated cycler.

FIG. 5 illustrates an alternative peritoneal dialysate generation flow path 501 with an integrated cycler 539. Water from a water source 502 can be pumped through filter 503 by system pump 504. The filter 503 can remove any particulate matter from the water prior to entering the peritoneal dialysate generation flow path 501. The water is then pumped through a water purification module, illustrated as a sorbent cartridge 506 in FIG. 5. As described, the water purification module can alternatively or additionally include activated carbon, a reverse osmosis module, a carbon filter, an ion exchange resin, and/or a nanofilter. The water enters the sorbent cartridge 506 through sorbent cartridge inlet 507 and exits through sorbent cartridge outlet 508. Pressure sensor 505 measures the pressure across sorbent cartridge 506. Filter 509 removes any particulate matter in the fluid after exiting sorbent cartridge 506. A conductivity sensor 510 determines the conductivity of the fluid exiting sorbent cartridge 506 to ensure the water has been purified. To generate the peritoneal dialysate, concentrates are added from concentrate source 513 through concentrate connector 514 by concentrate pump 515. Although shown as a single concentrate source 513 in FIG. 5, concentrates can be added from any number of separate concentrate sources. Concentrate filter 512 removes any particulate matter from the concentrate before entering the peritoneal dialysate generation flow path 501. A conductivity sensor 516 determines the conductivity of the generated peritoneal dialysate after addition of the concentrates to ensure the peritoneal dialysate has the correct solute concentrations. Flow meter 511 determines the flow rate of the fluid after addition of the concentrates. pH sensor 524 determines the pH of the peritoneal dialysate to ensure the peritoneal dialysate has a proper pH. The peritoneal dialysate can be heated to a desired temperature by heater 525. Temperature sensor 528 ensures the peritoneal dialysate is heated to an appropriate temperature before infusion into the patient 538. The heater 525 can be placed at any location in the flow path prior to delivery to the patient 538. In any embodiment, the heater 525 can be located after the exit of the sterilization module, particularly if fluid is stored prior to passing through the sterilization module. The desired temperature of the peritoneal dialysate can be between around 20° C. to around 41° C. As used herein, around 20° C. can include between 19.0° C. and 21.0° C., and around 41° C. can include between 39.0° C. and 41.0° C., or similar as understood by those of skill in the art. In certain embodiments, the desired temperature can be between around 25° C. to around 40° C., around 36.5° C. to around 37.25° C., around 25° C. to around 35° C., or around 30° C. to around 40° C. In a preferred embodiment, the desired temperature can be 37±2° C.

As described, the peritoneal dialysate is sterilized by pumping the peritoneal dialysate through a sterilization module, which can include first ultrafilter 518, and optionally a second ultrafilter 520 and/or an optional UV light source (not shown). Pressure sensor 517 measures the fluid pressure prior to the fluid entering the sterilization module, shown as ultrafilters 518 and 520, and is used in the control circuit to control the pressure. The fluid passes through first ultrafilter 518, through valve 519, and then through second ultrafilter 520. Connector 523, three way valve 521, and valve 519 allow backflushing and disinfection of the ultrafilters 518 and 520. The fluid is then pumped into the integrated cycler 539 for use in peritoneal dialysis. As described, the system can include a dialysate container (not shown) for storage of the generated peritoneal dialysate until used by the patient 538 at any location, including upstream or downstream of the sterilization module.

The integrated cycler 539 includes an infusion line 531 and a drain line 533. Bubble trap 526 traps air bubbles present in the heated dialysate. The air is vented from the system through bubble trap valve 527. Pressure sensor 529 ensures the pressure of the fluid is within a predetermined range. In certain embodiments, the predetermined range can be a pressure of between −200 mmHg to 500 mmHg, from −50 mmHg to 100 mmHg, from 0 mmHg to 100 mmHg, from −50 mmHg to 200 mm Hg, from 200 mmHg to 500 mmHg, or from 100 mmHg to 400 mmHg. The infusion line 531 is connected to a three-way valve 530, which controls fluid movement between the infusion line 531, the patient 538, and the drain line 533. The three way valve 530 is connected through connector 532 to a catheter inserted into the peritoneal cavity of the patient 538. A filter 522 can be included between the three-way valve 530 and the catheter for additional cleaning of the peritoneal dialysate prior to entering a patient 538. In any embodiment, the filter 522 can be a disposable filter. The peritoneal dialysate is infused into the patient 538 and held for a dwell period. After the dwell period, the fluid is pumped out of the peritoneal cavity of the patient 538 by drain pump 536. The three-way valve 530 is switched to direct fluid into the drain line 533. Pressure sensor 534 measures the pressure of fluid in the drain line 531 to ensure proper drainage. Flow meter 535 measures the flow rate and volume of fluid removed from the patient 538. The drain line 531 is connected to a drain or waste reservoir 537 through connector 540 for collection and disposal of the used peritoneal dialysate.

For automated disinfection of the system, connector 540 can be connected to connector 523 to form a flow loop. Disinfectant can be circulated through the flow loop and heated. The disinfectant can be heated to any temperature capable of disinfecting the system, including temperatures of at least around equal to 80° C. or greater (≥80) when using citric acid as a disinfectant. Peracetic acid or bleach can be used to disinfect the system at room temperature. The disinfectant can be introduced to the flow loop and recirculated at elevated temperatures to ensure complete disinfection. The disinfectant used can be any suitable disinfectant known in the art, including peracetic acid, citric acid, or bleach. The connectors and components of the system can be gamma and autoclave compatible to resist the high temperatures used during disinfection. The system can be primed by introducing a priming fluid to the peritoneal dialysate generation flow path 501 and integrated cycler 539.

Figure 6:
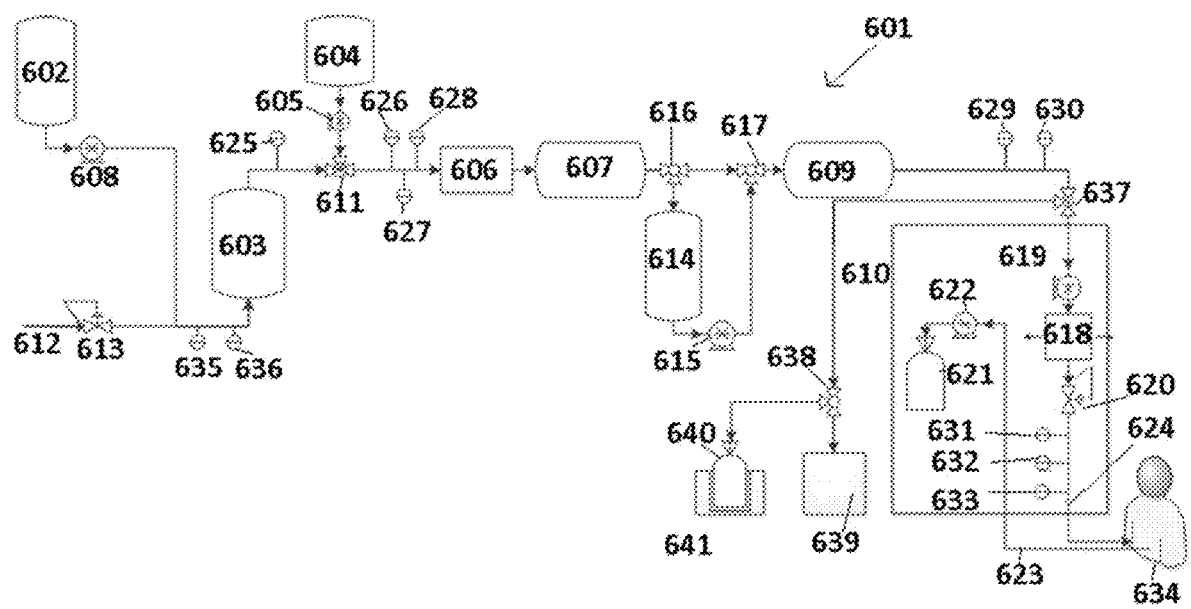
FIG. 6 shows a peritoneal dialysate generation flow path with multiple dispensing options.

FIG. 6 illustrates an alternative embodiment of the system. Fluid from a water source, such as water tank 602, can be pumped into the peritoneal dialysate generation flow path 601. Additionally, or as an alternative to a water tank 602, the system can use a direct connection to a water source 612. System pump 608 can control the movement of fluid through the peritoneal dialysate generation flow path 601. If a direct connection to a water source 612 is used, a pressure regulator 613 can ensure that an incoming water pressure is within a predetermined range. The system pumps the fluid from water source 602 or 612 through a water purification module 603 to remove chemical contaminants in the fluid in preparation for creating dialysate.

After the fluid passes through the water purification module 603, the fluid is pumped to a concentrate source 604, where necessary components for carrying out peritoneal dialysis can be added from the concentrate source 604. The concentrates in the concentrate source 604 are utilized to create a peritoneal dialysis fluid that matches a dialysate prescription. Concentrate pump 605 and concentrate valve 611 can control the movement of concentrates from the concentrate source 604 to the peritoneal dialysate generation flow path 601 in a controlled addition. Alternatively, concentrate valve 611 can be a hose T or backflow restricting hose T. The concentrates added from the concentrate source 604 to the peritoneal dialysate generation flow path 601 can include components required for use in peritoneal dialysate. Upon addition of solutes from the concentrate source 604, the fluid in the peritoneal dialysate generation flow path 601 can contain all the necessary solutes for peritoneal dialysis. The peritoneal dialysate should reach a level of sterility for peritoneal dialysis, as described. As shown in FIG. 6, the sterilization module can include one or more of a first ultrafilter 607, a second ultrafilter 609, and a UV light source 606.

The generated peritoneal dialysate can be pumped directly to an integrated cycler 610 for immediate infusion into a patient 634. Alternatively, the dialysate can be pumped to an optional dialysate container 614 as a pre-prepared bolus of solution for storage until ready for use by a patient 634. Valve 616 can control the movement of fluid to either the dialysate container 614. Stored dialysate in dialysate container 614 can be pumped as needed to back into the peritoneal dialysate generation flow path 601 by pump 615 through valve 617. The dialysate container 614 can store enough peritoneal dialysate for a single infusion of peritoneal dialysate into the patient 634, or enough peritoneal dialysate for multiple or continuous infusions into one or multiple patients.

The generated peritoneal dialysate can be pumped to valve 637. Valve 637 can control movement of the peritoneal dialysate to any of three options. First, the peritoneal dialysate can be pumped to integrated cycler 610, second diverted for use with a non-integrated external cycler 639, or third diverted to a dialysate container 640. All three options can be performed contemporaneously or selectively. If diverted to the non-integrated external cycler 639, the peritoneal dialysate can be pumped via valve 638. Valve 638 can control the movement of the peritoneal dialysate through either a direct connection to an external cycler 639 or to a dialysate container 640. Alternative valve and pump configurations for performing the same functions are contemplated by the present invention. For example, the direct connection to an external cycler 639 can use any type of connector known in the art. The connectors can be single-use or reusable connectors and should provide for sterile transfer of fluids. The connectors should preferably be closed connectors, to avoid contact between the fluids and the external environment. A non-limiting example of a connector that can be used for a direct connection to an external cycler is the INTACT® connectors provided by Medinstill Development LLC, Delaware, US. The dialysate container 640 can be heated with an optional heater 641 and then used in peritoneal dialysis. The connectors to the dialysate container 640 can be any type of connector known in the art. The connectors can be single use or disposable connectors that provide transfer of sterile fluids. A non-limiting example of connectors that can be used with the described system is the Lynx®-Millipore connectors available from Merck KGaA, Darmstadt, Germany.

The integrated cycler 610 can include a metering pump 619 for metering peritoneal dialysate into the peritoneal cavity of the patient 634. A heater 618 heats the peritoneal dialysate to a desired temperature prior to infusion into the patient 634. A pressure regulator 620 ensures the peritoneal dialysate pressure is within a predetermined range safe for infusion into the patient 634. The metering pump 619 can use any safe pressure for infusing fluid into the patient 634. Generally, the pump pressures are on average set at ±10.3 kPa or 77.6 mmHg. If there is no fluid flow, the maximum pressure can increase to ±15.2 kPa or 113.8 mmHg for a short period, such as less than 10 seconds. The peritoneal dialysate is infused into the peritoneal cavity of the patient 634 through infusion line 624. After a dwell period, the peritoneal dialysate is drained from the patient 634 through drain line 623. Pump 622 provides a driving force for removing the peritoneal dialysate from the patient 634. An optional waste reservoir 621 can be included to store the used peritoneal dialysate for disposal. Alternatively, the drain line 623 can be directly connected to a drain for direct disposal. The waste reservoir 621 can be any size, including between around 12 and around 25 L. For patients requiring a higher drainage, a drain manifold can be included for connecting multiple waste reservoirs.

Various sensors positioned in the peritoneal dialysate generation and infusion system ensure that the generated fluid is within predetermined parameters. Flow meter 635 ensures the incoming water is at a correct flow rate, while pressure sensor 636 ensures the incoming water is at an appropriate pressure. Conductivity sensor 625 is used to ensure that the water exiting water purification module 603 has been purified to a level safe for use in peritoneal dialysis. Conductivity sensor 626 ensures the conductivity of the dialysate after the addition of concentrates from concentrate source 604 is within a predetermined range. Refractive index sensor 627 insures that the concentration of the osmotic agents is within a predetermined range. pH sensor 628 ensures the pH of the peritoneal dialysate is within a predetermined range. After passing through the sterilization module including second ultrafilter 609, pH sensor 629 and conductivity sensor 630 are used to ensure that no changes in the pH or conductivity have occurred during purification or storage of the dialysate in dialysate container 614. The integrated cycler 610 has flow meter 631, pressure sensor 632 and temperature sensor 633 to ensure that the dialysate being infused into the patient 634 is within a proper flow rate, pressure, and temperature range.

Figure 7A:
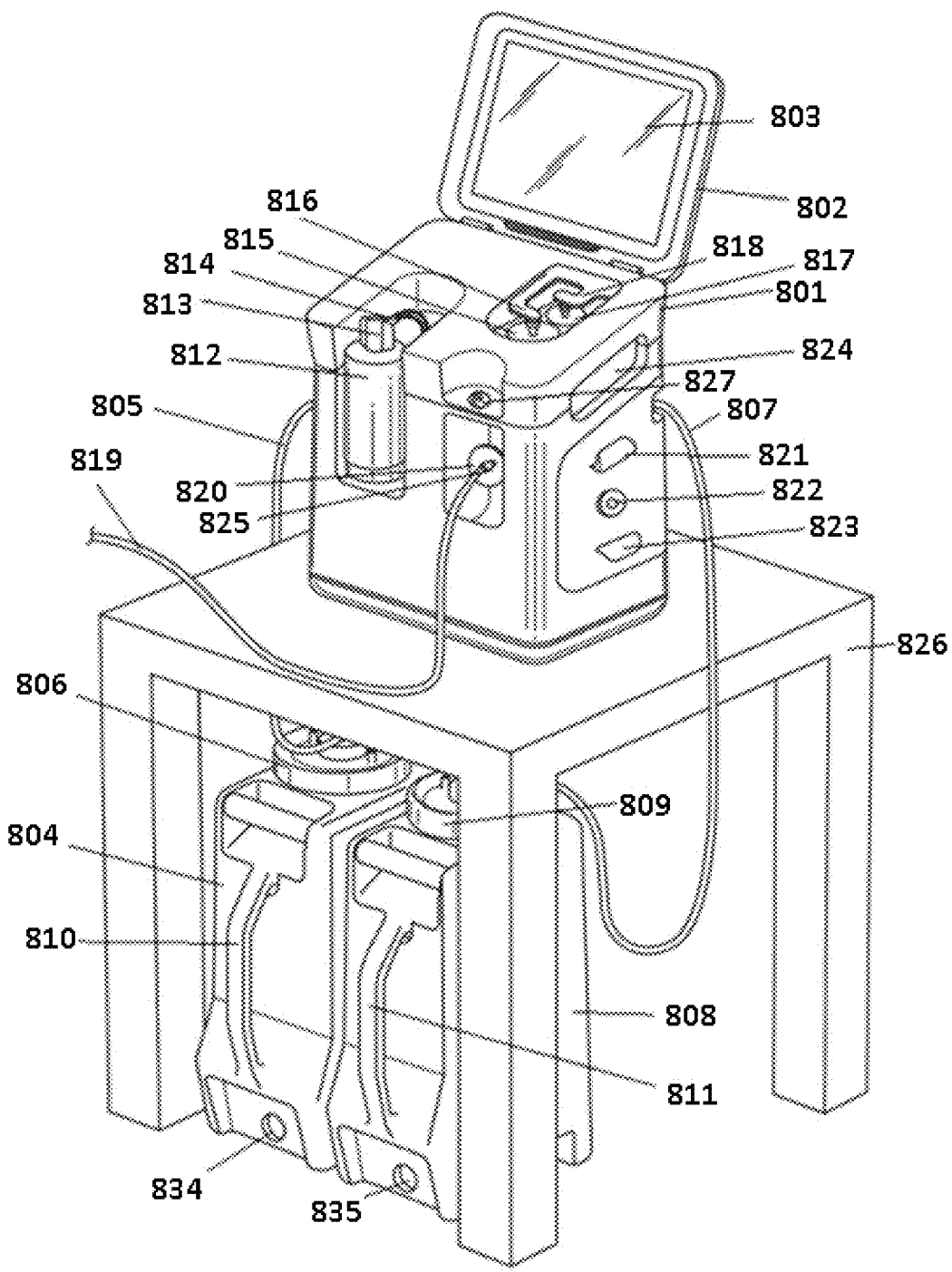
FIGS. 7A-D show a peritoneal dialysate generation cabinet with a water reservoir and waste reservoir.
Figure 7B:
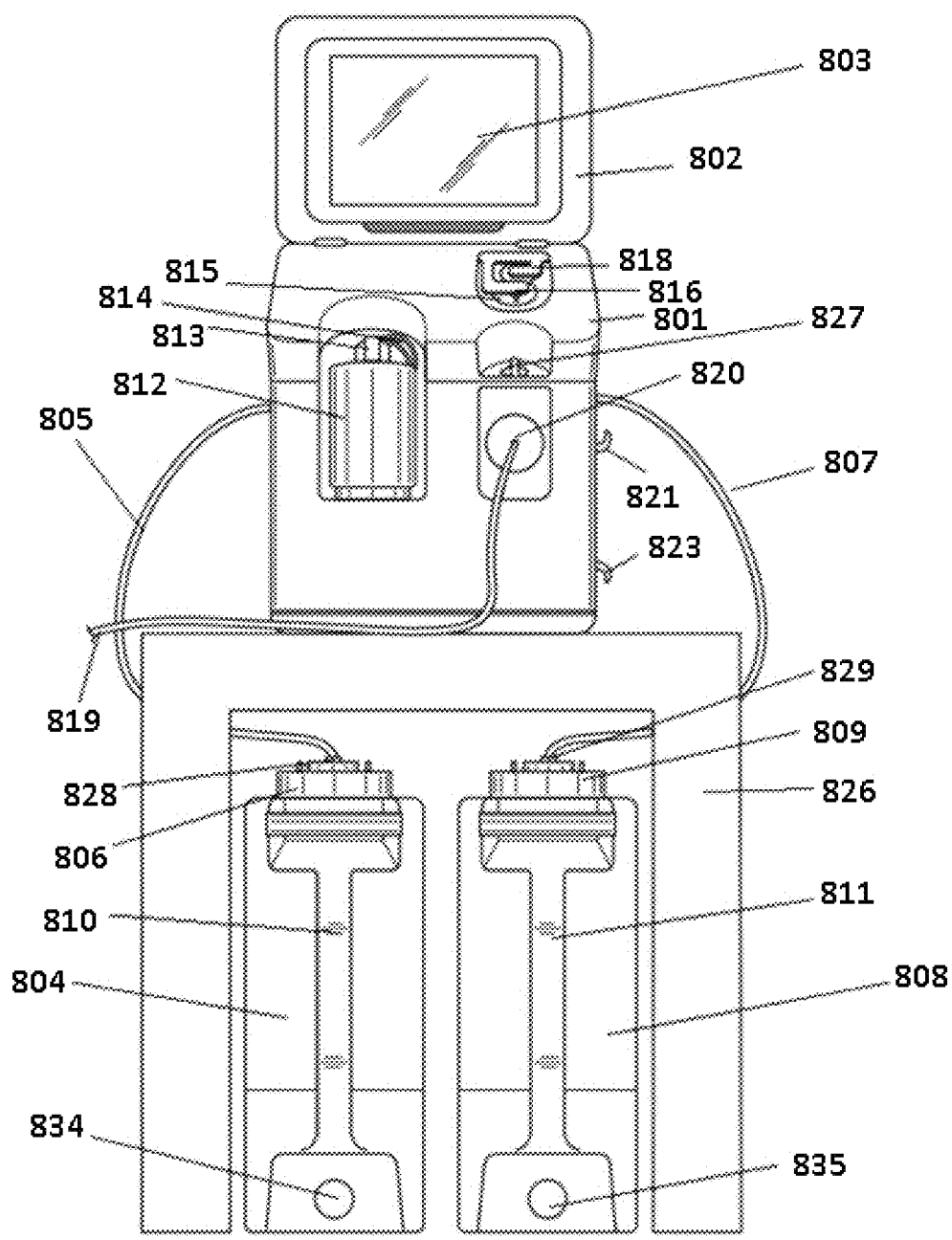
Figure 7C:
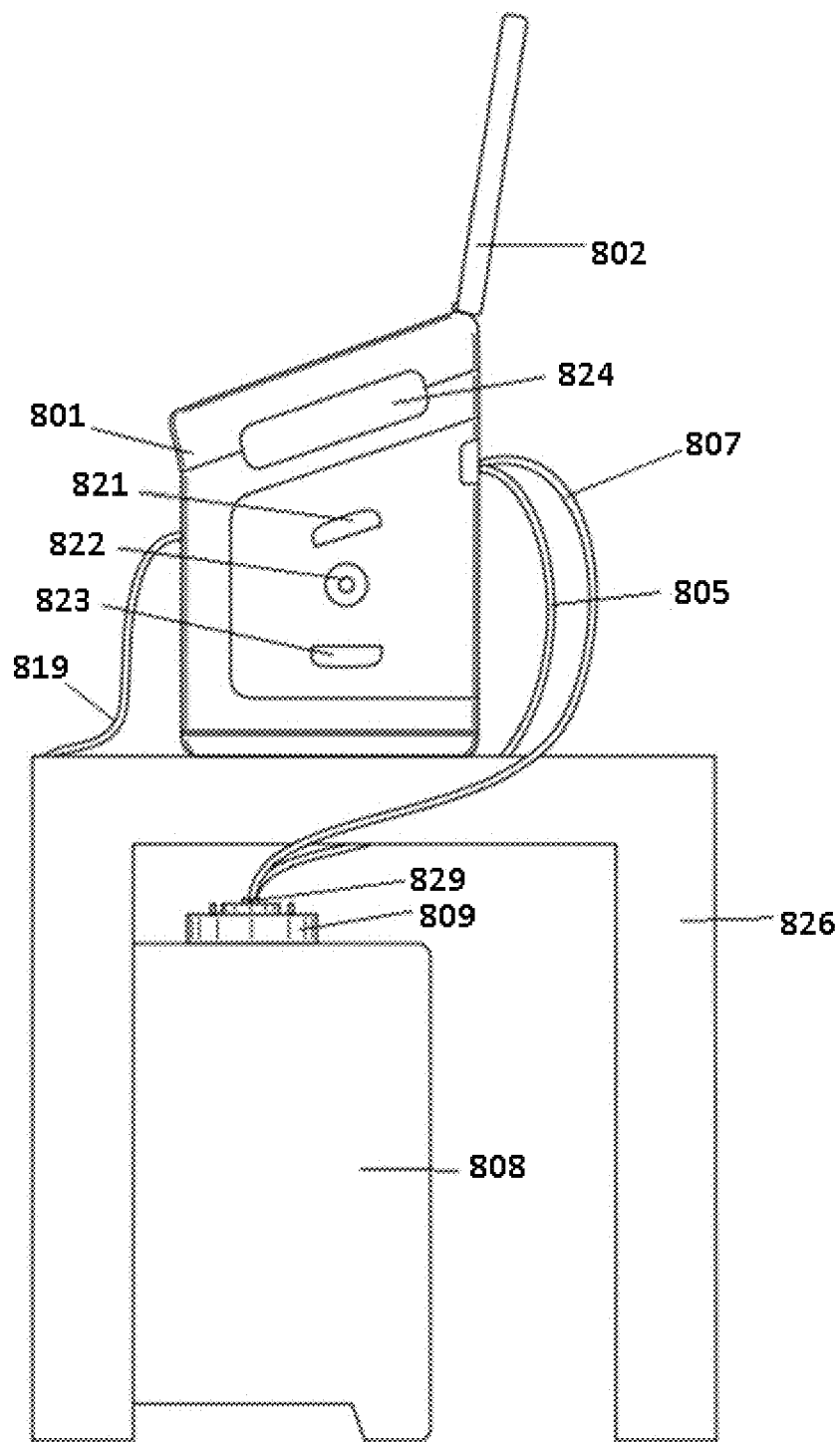
Figure 7D:
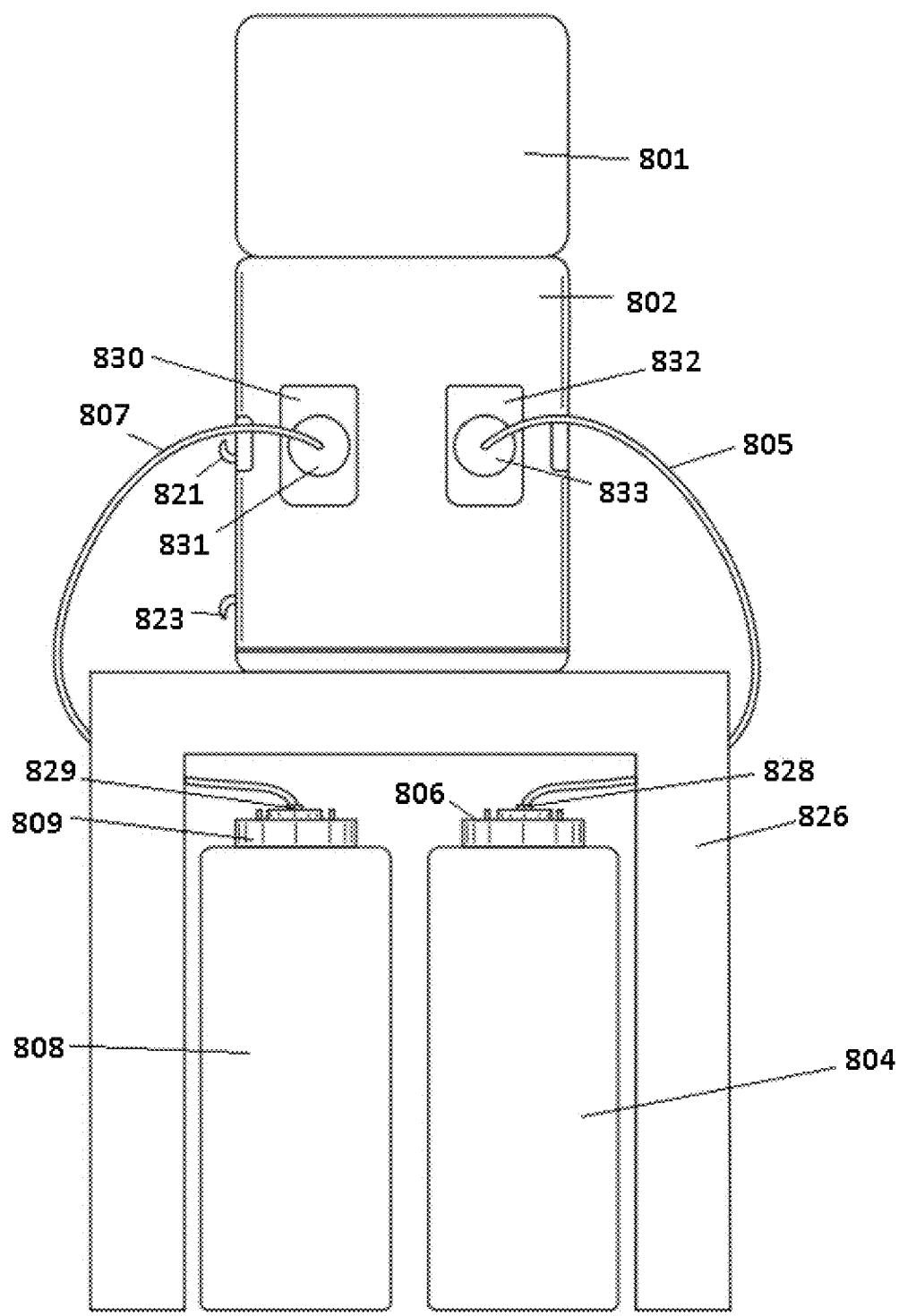

FIGS. 7A-D illustrate a non-limiting embodiment of the peritoneal dialysate generation system arranged as a peritoneal dialysate generation cabinet 801. FIG. 7A illustrates a perspective view of the peritoneal dialysate generation cabinet 801, FIG. 7B illustrates a front view of the peritoneal dialysate generation cabinet 801, FIG. 7C illustrates a side view of the peritoneal dialysate generation cabinet 801, and FIG. 7D illustrates a back view of the peritoneal dialysate generation cabinet 801.

A fluid line 805 can connect a water source 804 to the peritoneal dialysate generation cabinet 801. The fluid line 805 can enter through a connector 828 in a top 806 of the water source 804. The fluid line 805 connects to the peritoneal dialysate generation flow path as described with reference to FIGS. 1 and 5-6 through a back of the peritoneal dialysate generation cabinet 801 through connector 832 having a fitting 833 for holding the fluid line 805, as illustrated in FIG. 7D. Any of the fluid lines illustrated can be disconnected and removed from the system for cleaning and replacement. A pump (not shown) can provide a driving force for the movement of fluid throughout the peritoneal dialysate generation flow path if required. Water is pumped through the peritoneal dialysate generation cabinet 801 to a water purification module, shown as sorbent cartridge 812 in FIGS. 7A-B. The water can enter the sorbent cartridge 812 through tubing (not shown) connected to the bottom of the sorbent cartridge 812 within the peritoneal dialysate generation cabinet 801. The water exits the sorbent cartridge 812 through connector 813 and tubing 814. An osmotic agent from osmotic agent source 815 and an ion concentrate from an ion concentrate source 817 are added to the fluid as described to generate non-sterilized peritoneal dialysate. The osmotic agent concentrate is added to the fluid through paddle connector 816. The ion concentrate is added to the fluid through paddle connector 818. A concentrate pump (not shown) can provide a driving force to move fluid from the concentrate sources into the peritoneal dialysate generation flow path inside of the peritoneal dialysate generation cabinet 801. As described, the system can use a single ion concentrate source in place of the two sources shown in FIGS. 7A-B, or more than two concentrate sources. The generated peritoneal dialysate can then be pumped through a sterilization module (not shown), such as an ultrafilter. A second ultrafilter and/or a UV light source can also be included. An integrated cycler (not shown in FIGS. 7A-D) can then pump the dialysate into infusion line 819 through connector 820 and into the patient. Fitting 825 allows the infusion line 819 to be removed from the system for cleaning or replacement. Waste fluids can be pumped out of the system through waste line 807, which connects to the peritoneal dialysate generation cabinet 801 through connector 830 having fitting 831. A separate waste line for removing used dialysate from the patient (not shown in FIGS. 7A-D) can also connect to the peritoneal dialysate generation cabinet 801 and connect to waste line 807. The waste line 807 enters waste container 808 through a connector 829 in the top 809 of the waste container 808. Handles 810 and 811 can be included on water source 804 and waste container 808 for easy movement and storage. Although the peritoneal dialysate generation cabinet 801 is illustrated on top of table 826 in FIGS. 7A-D, the peritoneal dialysate generation cabinet 801 can be used on any stable flat surface.

As described, the peritoneal dialysate generation flow path can include various sensors for detection of conductivity, pH, refractive index, or other dialysate parameters. The sensors can be included either inside or outside of the body of the peritoneal dialysate generation cabinet 801. The fluid lines and valves connecting the components of the peritoneal dialysate generation flow path can likewise be positioned inside of the cabinet body. As described, a top of the peritoneal dialysate generation cabinet 801 can have a graphical user interface 802 including screen 803. Messages from the control system to the user, or from the user to the control system, can be generated and read through the graphical user interface 802. The user can direct the generation of peritoneal dialysate through the graphical user interface 802, and can receive messages from the system through screen 803. The system can generate alerts to the user, including any problems detected by any of the sensors, as well as the progress of peritoneal dialysate generation. A handle 824 can be included for opening the peritoneal dialysate generation cabinet 801 to allow access to components on the inside of the cabinet. Handles 821 and 823 can be included to hold the fluid lines and power cord when not in use.

Disinfection connector 822 illustrated in FIGS. 7A and 7C can be included for disinfection of the waste line 807. During disinfection, the waste line 807 can be disconnected from waste container 808 and connected to disinfection connector 822. Disinfectant solution from a disinfectant source (not shown in FIGS. 7A-D) can then be circulated through the waste line 807 to disinfect the waste line 807. Disinfection connector 827 can be included for disinfection of fluid line 805. Fluid line 805 can be connected to disinfection connector 822 and disinfection solution can be circulated through the fluid line 805. Drain 834 on water source 804 and drain 835 on waste container 808, allow the water source 804 and waste container 808 to be drained without inverting the containers.

FIG. 8 illustrates a peritoneal dialysate generation cabinet 901 using a non-purified water source, faucet 905 in sink 904. Although illustrated as faucet 905 and sink 904, one of ordinary skill in the art will understand that any water source can be used. The ability to use municipal or other non-purified sources of water allow the peritoneal dialysate generation system to work at a patient's home without the need to store large amounts of purified water or dialysate. Fitting 906 connects the water line 907 to the faucet 905 or other water source, allowing the water line 907 to be connected or disconnected as necessary. A pump (not shown) can provide a driving force for the movement of fluid throughout the peritoneal dialysate generation flow path as described with respect to FIGS. 1 and 5-6. The water is pumped through the peritoneal dialysate generation cabinet 901 to a water purification module, shown as sorbent cartridge 911 in FIG. 8. The water enters the sorbent cartridge 911 through tubing (not shown) connected to the bottom of the sorbent cartridge 911 within the peritoneal dialysate generation cabinet 901. The water exits the sorbent cartridge 911 through connector 926 and tubing 912. An osmotic agent from osmotic agent source 913 and an ion concentrate from an ion concentrate source 914 are added to the fluid as described to generate non-sterilized peritoneal dialysate. The osmotic agent concentrate is added to the fluid through paddle connector 916. The ion concentrate is added to the fluid through paddle connector 915. A concentrate pump (not shown) can provide a driving force to move fluid from the concentrate sources into the peritoneal dialysate generation flow path inside of the peritoneal dialysate generation cabinet 901. As described, the system can use a single ion concentrate source in place of the two sources shown in FIG. 8, or more than two concentrate sources. The generated peritoneal dialysate can then be pumped through a sterilization module (not shown), such as an ultrafilter. A second ultrafilter and/or a UV light source can also be included. An integrated cycler (not shown in FIG. 8) can then pump the dialysate into infusion line 917 through connector 918 and into the patient. Fitting 919 allows the infusion line 917 to be removed from the system for cleaning or replacement. Waste fluids can be pumped out of the system through waste line 908, which can connect to a drain 909 shown in bathtub 910. A separate drain line (not shown) from the patient can be included to move used dialysate into the drain 909. Although shown as a bathtub drain 909 in FIG. 8, the waste fluids can be conveyed to any type of drain, or alternatively to a waste container as illustrated in FIGS. 7A-D. Although the peritoneal dialysate generation cabinet 901 is illustrated on top of table 924 in FIG. 8, the peritoneal dialysate generation cabinet 901 can be used on any stable flat surface. In certain embodiments, the peritoneal dialysate generation cabinet 901 and the patient can be in the same room as the water source and drain 909. Alternatively, the patient and/or peritoneal dialysate generation cabinet 901 can be in a separate room, with tubing long enough to reach patient. For longer distances, the tubing should be strong enough to withstand the pressures necessary in pumping fluid over longer distances.

As described, a top of the peritoneal dialysate generation cabinet 901 can have a graphical user interface 902 including screen 903. Messages from the control system to the user, or from the user to the control system, can be generated and read through the graphical user interface 902. The user can direct the generation of peritoneal dialysate through the graphical user interface 902, and can receive messages from the system through screen 903. The system can generate alerts to the user, including any problems detected by any of the sensors, as well as the progress of peritoneal dialysate generation. A handle 920 can be included for opening the peritoneal dialysate generation cabinet 901 to allow access to components on the inside of the cabinet. Handles 921 and 923 can be included to hold the fluid lines and power cord when not in use.

Disinfection connector 922 can be included for disinfection of the waste line 908. During disinfection, the waste line 908 can be disconnected from the drain 909 and connected to disinfection connector 922. Disinfectant solution from a disinfectant source (not shown in FIG. 8) can then be circulated through the waste line 908 to disinfect the waste line 908. Disinfection connector 925 can be included for disinfection of water line 907. The water line 907 can be disconnected from faucet 905 and connected to disinfection connector 925. Disinfectant solution can be circulated through the water line 907 for disinfection.

Figure 9:
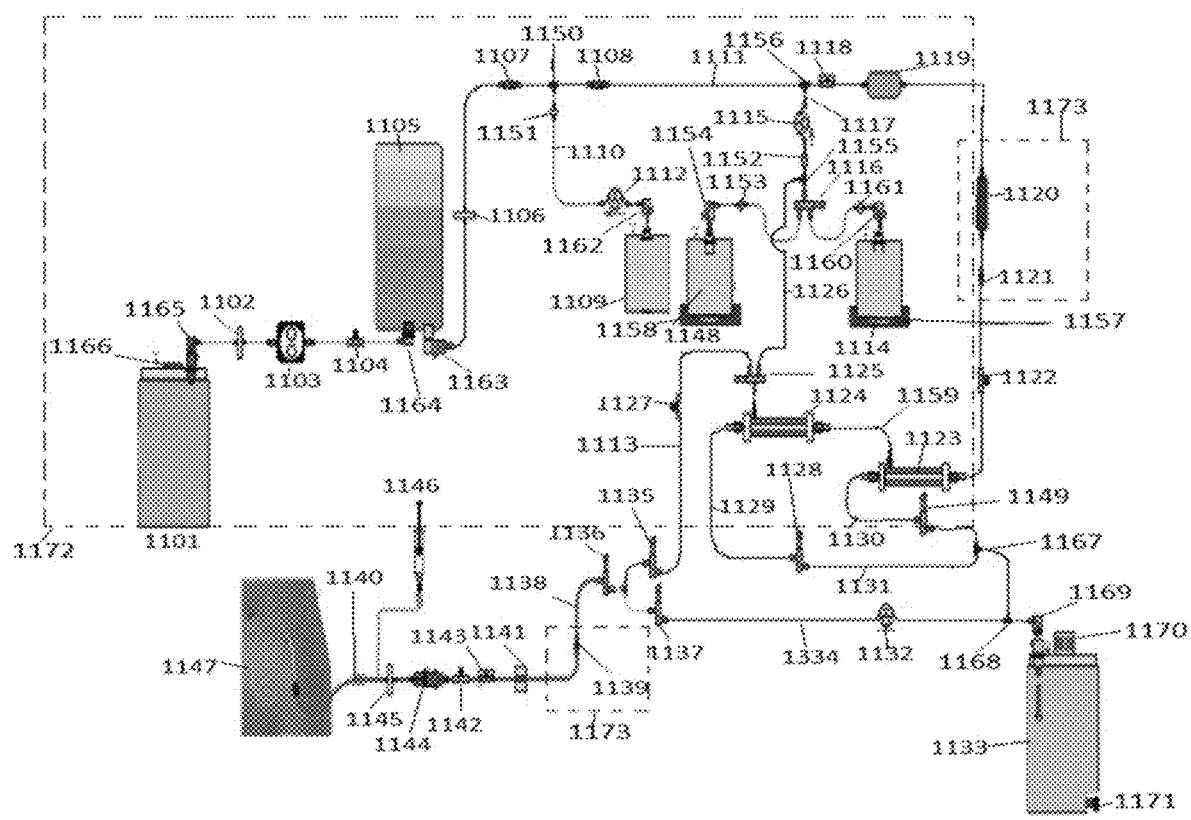
FIG. 9 shows a peritoneal dialysate generation and delivery system.

FIG. 9 illustrates an alternative non-limiting embodiment of a peritoneal dialysate generation flow path 1111. Water from water source 1101 can be pumped into the peritoneal dialysate generation flow path 1111 by system pump 1103 through connector 1165. Although shown with screw top 1166 in FIG. 9, any method can be used with the water source 1101 to fill and drain the water source 1101. The water can be pumped through filter 1102 to remove any particulate matter from the water prior to entering the peritoneal dialysate generation flow path 1111. Alternatively, a dedicated water source, such as a tap or a municipal water source, can be used in place of water source 1101. Pressure sensor 1104 measures the pressure upstream of sorbent cartridge 1105. In certain embodiments, an alternative water purification module can be used in place of sorbent cartridge 1105, including a reverse osmosis module, a nanofilter, a combination of ion and anion exchange materials, activated carbon, silica, or silica based columns. The shading in sorbent cartridge 1105 shows varying layers of sorbent material. However, any order of sorbent material layers can be used, or the sorbent materials can be intermixed. In FIG. 9, the sorbent cartridge 1105 has a fluid inlet 1164 and fluid outlet 1163 in a base of the sorbent cartridge 1105. In certain embodiments, the fluid inlet 1164 and fluid outlet 1163 can instead be on opposite sides of the sorbent cartridge 1105. A filter 1106 can remove particulate matter in the fluid exiting sorbent cartridge 1105.

A first conductivity sensor 1107 can measure the conductivity of the fluid exiting sorbent cartridge 1105. One or more infusates can be added from ion concentrate source 1109 through connector 1162 to infusate line 1110 by concentrate pump 1112 to the peritoneal dialysate generation flow path 1111 at T-junction 1150. Filter 1151 can remove any particulate matter from the infusate concentrate prior to reaching the peritoneal dialysate generation flow path 1111. Alternatively, a valve can be used in place of T-junction 1150. A secondary conductivity sensor 1108 can measure the conductivity of the fluid after addition of the infusates to ensure proper concentrations of each infusate. As described, the system can include any number of infusate sources, each with the same or separate infusate pumps and infusate lines. A fluid having a specific known concentration of solutes will have a specific conductivity. As such, a control system in communication with secondary conductivity sensor 1108 can measure the conductivity of the fluid with secondary conductivity sensor 1108 to ensure the conductivity is within a predetermined range of a patient dialysate prescription. The control system can also adjust an ion concentrate flow rate by adjusting the pump rate of concentrate pump 1112 based on data received from secondary conductivity sensor 1108. If the conductivity measured by secondary conductivity sensor 1108 is below a predetermined range from the dialysate prescription, the control system can increase the ion concentrate flow rate. If the conductivity measured by secondary conductivity sensor 1108 is above a predetermined range from the dialysate prescription, the control system can decrease the ion concentrate flow rate.

A secondary concentrate pump 1115 forming part of a secondary infusate line 1117 can add an osmotic agent to the peritoneal dialysate generation flow path 1111 through secondary infusate line 1117 at T-junction 1156. Although shown as a single secondary infusate line 1117 in FIG. 9, one of skill in the art will understand that any number of secondary infusate lines can be used to connect separate osmotic agent sources to the peritoneal dialysate generation flow path 1111. A secondary composition sensor 1152 can measuring the osmotic agent concentration of the fluid in secondary infusate line 1117. A control system in communication with a secondary composition sensor 1152 can use the osmotic agent concentration in secondary infusate line 1117 in setting an osmotic agent flow rate based on a dialysate prescription. The final osmotic agent concentration in the dialysate will be a function of the osmotic agent concentration in secondary infusate line 1117 and the relative rates of the dialysate flow through peritoneal dialysate generation flow path 1111 and secondary infusate line 1117. As illustrated in FIG. 9, the system can have multiple osmotic agent sources, including dextrose source 1148 fluidly connected to osmotic agent line through connector 1154 and icodextrin source 1114 fluidly connected to osmotic agent line through connector 1160. The user or control system can select the appropriate osmotic agent to use based on the needs of the patient, as described. Filter 1153 can remove particulate matter from fluid exiting dextrose source 1148 and filter 1161 can remove particulate matter form fluid exiting icodextrin source 1114. Alternative osmotic agent sources, including an amino acid source or a glucose source, can be used in place of, or in addition to, the dextrose source 1148 and icodextrin source 1114, allowing customization of the osmotic agents used. Valve 1116 controls the source from which the osmotic agent is obtained. Alternatively, multiple osmotic agent lines and osmotic agent pumps can be used. A flow meter 1118 measures the flow rate of fluid through the peritoneal dialysate generation flow path 1111. A composition sensor 1119 can measure the concentrations of the osmotic agents in the fluid, as well as the infusates. The composition sensor can include a single sensor, or multiple sensors measuring separate fluid parameters. The composition sensors 1152 and 1119 can include a refractive index sensor, an enzyme-based sensor, and/or a pulsed amperometric detection sensor. The composition sensors 1152 and 1119 can also include conductivity sensors, pH sensors, and/or flow meters. Using composition sensor 1119 and secondary conductivity sensor 1108, the control system can determine the concentrations of the ions and osmotic agents in peritoneal dialysate generation flow path 1111. If the osmotic agent concentration or ion concentrations outside of a predetermined range from the dialysate prescription, the system can generate an alert and/or stop treatment. The system can also adjust the ion concentrate flow rate and/or osmotic agent flow rate to bring the ion concentration and osmotic agent concentrations to within the predetermined range of the dialysate prescription.

Heater 1120 heats the fluid in the peritoneal dialysate generation flow path 1111 to the patient body temperature. Temperature sensor 1121 measures the temperature of the fluid and can be used to by a control system to control the heater 1120, heating the fluid to a temperature of between around 25° C. to around 40° C. In a preferred embodiment, the desired temperature can be 37±2° C. or between 36.5 to 37.25° C. A control system can monitor the temperature and shut off flow or generate an alarm if the temperature is outside of the desired range. In certain embodiments, the control system can shut off flow if the temperature is equal to greater than around 41° C. Pressure sensor 1122 measures the pressure of the fluid prior to entering a dialysate sterilization module.

The dialysate sterilization module can include a first ultrafilter 1123 and a second ultrafilter 1124 fluidly connected by fluid line 1159. The fluid flows through both ultrafilters to remove any chemical or biological contaminants. Waste fluid can exit the first ultrafilter 1123 through fluid line 1130 and exit the second ultrafilter 1124 through fluid line 1129. Valves 1149 and 1128 control the movement of fluid between the first ultrafilter 1123 and second ultrafilter 1124 into waste line 1131, which is fluidly connected to fluid line 1130 at T-junction 1167. Valves 1149 and 1128 can be used to modulate the fluid movement out of ultrafilters 1123 and 1124 to ensure sufficient pressure for ultrafiltration. If the pressure in ultrafilter 1124 decreases below a necessary value, valve 1128 can be closed, preventing fluid movement from ultrafilter 1123 into fluid line 1130 and increasing the pressure in ultrafilter 1124. The waste line 1131 is fluidly connected to a waste line 1134 at T-junction 1168 and to waste reservoir 1133 through connector 1169, or alternatively, to a drain. Although shown with a screw top 1170 and tap 1171, one of skill in the art will understand that alternative methods for filling and draining waste reservoir 1133 can be used.

Fluid exiting the second ultrafilter 1124 passes through valve 1125. Valve 1125 can direct the fluid into either fluid line 1113 and an integrated cycler or into fluid line 1126 for addition to the dextrose source 1148 and icodextrin source 1114 via T-junction 1155. The fluid can be added to dextrose source 1148 and icodextrin source 1114 to dissolve solid icodextrin and solid dextrose prior to generating the peritoneal dialysate.

Fluid line 1113 can include a pressure sensor 1127 to ensure that the fluid pressure is within predetermined limits prior to entering the integrated cycler. Valve 1135 controls the movement of fluid from the sterilization module. Valve 1136 controls the movement of fluid into and out of the integrated cycler through cycler line 1138.

The cycler line 1138 can include a second temperature sensor 1139 to ensure the proper temperature of the peritoneal dialysate prior to infusion into the patient 1147. An air detector 1141 is included to detect any air that would otherwise be introduced into the patient 1147. A bubble trap (not shown) can be included to remove any detected air. A flow meter 1143 measures the flow rate of fluid in the cycler line 1138 and can be used to control the amount of peritoneal dialysate infused into the patient 1147. A pressure sensor 1142 can be included to ensure the fluid pressure in cycler line 1138 is within predetermined limits for infusion into the patient 1147. A catheter 1140 can connect to the cycler line 1138 at connection 1144. In certain embodiments, a heparin syringe 1146 can be included to add heparin or other medication to the peritoneal dialysate. Filter 1145 removes any particulate matter prior to infusion into the patient 1147.

After a dwell period, the spent peritoneal dialysate can be drained from the patient 1147 through the cycler line 1138. Drain pump 1132 can provide the driving force for draining the spent peritoneal dialysate. The spent peritoneal dialysate passes through valves 1136 and 1137 and into drain line 1134, which can fluidly connect to waste reservoir 1133 or to a drain.

As illustrated in FIG. 9, the dialysate preparation system can be fluidly connected to a dialysate preparation system. The dialysate preparation system can include the conductivity sensors 1107 and 1108, the ion concentrate source 1109, one or more osmotic agent sources illustrated as icodextrin source 1114 and dextrose source 1148, infusate lines 1110 and 1117, and composition sensors 1152 and 1119, shown as dashed box 1172. The dialysate generation system can also include a water purification module, illustrated as sorbent cartridge 1105 in FIG. 9, and a sterilization module illustrated as ultrafilters 1123 and 1124 in FIG. 9.

As illustrated in FIG. 9, the secondary infusate line 1117 can be fluidly connected to the second ultrafilter 1124 of the sterilization module by fluid line 1126. In certain embodiments, a solid source of the osmotic agents and/or infusates can be used. The solid source can be placed in dextrose source 1148 and icodextrin source 1114. To generate an osmotic agent concentrate, water from water source 1101 can be added to the dextrose source 1148 and icodextrin source 1114, generating a concentrate of known concentration. To ensure that the icodextrin source 1114 and dextrose source 1148 remain free from chemical or biological contamination, the water can first be passed through the sterilization module, including first ultrafilter 1123 and second ultrafilter 1124 prior to addition to the osmotic agent sources. Water from water source 1101 can be pumped through sorbent cartridge 1105 and peritoneal dialysate generation flow path 1111. Heater 1120 heats the water and is controlled by a control system based on data received from temperature sensor 1121. The control system can control heater 1120 to heat the water to a set temperature, which will affect the solubility of the osmotic agents and allow the osmotic agent concentrate to be of known concentration. The water is then pumped through first ultrafilter 1123, through fluid line 1159 and second ultrafilter 1124. Valve 1125 can direct the water from the second ultrafilter 1124 through fluid line 1126 and into each of icodextrin source 1114 and dextrose source 1148 via secondary infusate line 1117 to generate osmotic agent concentrates free from contamination. As described, the peritoneal dialysate generation system can include any number of osmotic agent sources, and the second ultrafilter 1124 can be fluidly connected to each osmotic agent source. Although not illustrated in FIG. 9, the second ultrafilter 1124 can also be fluidly connected to the ion concentrate source 1109 to generate an ion concentrate free from chemical or biological contamination. Heater 1120 can heat the water prior to passing through the first ultrafilter 1123 and second ultrafilter 1124. Using heated water to dissolve the osmotic agents can allow for a faster and more complete dissolution in order to minimize system preparation time before treatment can begin. In certain embodiments, the water can be heated to between around 25° C. to around 90° C. to minimize dissolution time of the PD fluid components, while also minimizing formation of glucose degradation products. The osmotic agent concentrate can then be mixed with the purified water in the peritoneal dialysate generation flow path 1111 and the temperature can be diluted down by the incoming stream. Vibration plate 1157 can agitate the solution in icodextrin source 1114, and vibration plate 1158 can agitate the solution in dextrose source 1148 to further speed dissolution of the osmotic agents. A vibration plate or other means of agitating the ion concentrate source can be included. One of skill in the art will understand that alternative means of agitating the ion concentrates can be used, including stirrers or other mixers.

One skilled in the art will understand that various combinations and/or modifications and variations can be made in the described systems and methods depending upon the specific needs for operation. Moreover, features illustrated or described as being part of an aspect of the invention may be used in the aspect of the invention, either alone or in combination, or follow a preferred arrangement of one or more of the described elements.

We claim:
1. A system, comprising:
 a first fluid line fluidly connected to a water purification module;
 at least one ion concentrate source fluidly connected to the first fluid line through a first infusate line;
  the first infusate line being located between the at least one ion concentrate source and the first fluid line;
  the first infusate line comprising at least one first pump;
 at least one osmotic agent source fluidly connected to the first fluid line through a secondary infusate line,
  the secondary infusate line being located, downstream of the first infusate line, between the at least one osmotic agent source and the first fluid line;
  the secondary infusate line comprising at least one second pump,
  wherein the at least one osmotic agent source contains glucose or dextrose;
 a first conductivity sensor positioned in the first fluid line between the first infusate line and the secondary infusate line to measure a conductivity of dialysate in the first fluid line after addition of at least one ion concentrate;
 a first composition sensor positioned in the secondary infusate line, between the at least one osmotic agent source and the first fluid line, to measure an osmotic agent concentration in the secondary infusate line;
 a second composition sensor positioned in the first fluid line downstream of the first conductivity sensor to measure at least an osmotic agent concentration in the dialysate in the first fluid line after addition of at least one osmotic agent; and
 a control system in communication with the first conductivity sensor, the first composition sensor, and the second composition sensor, the control system programmed to:
  determine an osmotic agent concentration in the secondary infusate line based on the first composition sensor;
  set an osmotic agent flow rate based on the osmotic agent concentration in the secondary infusate line and a dialysate prescription;
  determine an osmotic agent concentration in the first fluid line based on the second composition sensor; and
  when the osmotic agent concentration in the first fluid line is determined to be outside of a predetermined range of the dialysate prescription, adjust the osmotic agent flow rate so as to bring the osmotic agent concentration within the predetermined range of the dialysate prescription.
2. The system of claim 1, further comprising at least one flow meter in the first fluid line.
3. The system of claim 1, wherein the at least one osmotic agent source is fluidly connected to the secondary infusate line.
4. The system of claim 3, further comprising one or more valves fluidly connecting the at least one osmotic agent source to the secondary infusate line.
5. The system of claim 1, wherein the control system is in communication with the first conductivity sensor and the first composition sensor, the control system controlling an ion concentrate flow rate based on a measurement by the first conductivity sensor.
6. The system of claim 1, further comprising at least one pH sensor in the first fluid line.

7. The system of claim 1, further comprising:
the first composition sensor and the second composition sensor are selected from the group consisting of a refractive index sensor, an enzyme-based sensor, and a pulsed amperometric detection sensor.

8. The system of claim 1, further comprising a second fluid line fluidly connecting the secondary infusate line to a sterilization module.

9. The system of claim 1, wherein an integrated cycler comprises a metering pump, an in-line heater, and a pressure regulator.

10. A method, comprising:
pumping water from a water source through a water purification module into a first fluid line;
pumping an ion concentrate from at least one ion concentrate source through a first infusate line into the first fluid line;
wherein the first infusate line is located between the at least one ion concentrate source and the first fluid line;
measuring a first conductivity of a fluid in the first fluid line downstream of the first infusate line after addition of the ion concentrate using a first conductivity sensor to determine a concentration of the ion concentrate in the fluid;
pumping an osmotic agent concentrate from at least one osmotic agent source through a secondary infusate line into the first fluid line, wherein the at least one osmotic agent source contains glucose or dextrose;
wherein the secondary infusate line is located, downstream of the first infusate line, between the at least one osmotic agent source and the first fluid line;
measuring a concentration of at least one osmotic agent in the secondary infusate line, downstream of the first conductivity sensor, using a composition sensor, wherein the composition sensor is positioned in the secondary infusate line, between the at least one osmotic agent source and the first fluid line;
determining an ion concentration in the fluid based on the first conductivity sensor;
determining an osmotic agent concentration in the fluid based on the composition sensor;
when the ion concentration is determined to be outside of a predetermined range of a dialysate prescription, controlling a pump rate of the ion concentrate so as to bring the ion concentration within the predetermined range of the dialysate prescription;
when the osmotic agent concentration is determined to be outside of a predetermined range of a dialysate prescription, controlling a pump rate of the osmotic agent concentrate so as to bring the osmotic agent concentration within the predetermined range of the dialysate prescription.

11. The method of claim 10, further comprising;
measuring the concentration of the at least one osmotic agent in the first fluid line downstream of the secondary infusate line.

12. The method of claim 10, further comprising:
receiving the dialysate prescription; and
setting an ion concentrate flow rate and an osmotic agent flow rate based on the dialysate prescription.

13. The method of claim 12, wherein setting the ion concentrate flow rate and the osmotic agent flow rate is performed by a control system in communication with at least one first pump in the first infusate line and at least one second pump in the secondary infusate line.

14. The method of claim 13, wherein the control system sets the osmotic agent flow rate based on the osmotic agent concentration and the dialysate prescription.

15. The method of claim 12, further comprising:
generating an alert if at least one of the osmotic agent concentration is outside of the predetermined range from the dialysate prescription.

16. The method of claim 10, further comprising at least one of:
generating the ion concentrate by pumping purified water from a sterilization module into the at least one ion concentrate source; or
generating the osmotic agent concentrate by pumping the purified water from the sterilization module into the at least one osmotic agent source.

* * * * *